US012023873B2

(12) United States Patent
Hayes, Jr.

(10) Patent No.: US 12,023,873 B2
(45) Date of Patent: Jul. 2, 2024

(54) METHOD AND APPARATUS TO ASSEMBLE A HIGH PURITY LIQUID DISTRIBUTION SYSTEM

(71) Applicant: Fit-Line, Inc., Santa Ana, CA (US)

(72) Inventor: Frank F. Hayes, Jr., Costa Mesa, CA (US)

(73) Assignee: Fit-Line, Inc., Santa Ana, CA (US)

( * ) Notice: Subject to any disclaimer, the term of this patent is extended or adjusted under 35 U.S.C. 154(b) by 163 days.

(21) Appl. No.: 17/932,221

(22) Filed: Sep. 14, 2022

(65) Prior Publication Data

US 2023/0009178 A1 Jan. 12, 2023

Related U.S. Application Data

(62) Division of application No. 16/434,515, filed on Jun. 7, 2019, now Pat. No. 11,518,114.

(51) Int. Cl.
*B29C 65/00* (2006.01)
*B29C 65/66* (2006.01)
*F16L 7/02* (2006.01)
*F16L 33/18* (2006.01)
*F16L 33/22* (2006.01)

(52) U.S. Cl.
CPC ...... *B29C 66/91411* (2013.01); *B29C 65/665* (2013.01); *B29C 66/51* (2013.01); *B29C 66/5221* (2013.01); *F16L 7/02* (2013.01); *F16L 33/18* (2013.01); *F16L 33/223* (2013.01); *F16L 2201/00* (2013.01)

(58) Field of Classification Search
None
See application file for complete search history.

(56) References Cited

U.S. PATENT DOCUMENTS

| | | |
|---|---|---|
| 5,203,062 A | 4/1993 | Nishio |
| 5,388,871 A | 2/1995 | Saitoh |
| 5,516,159 A | 5/1996 | Hirakawa |
| 5,743,572 A | 4/1998 | Nishio |
| 6,142,535 A | 11/2000 | Nishio |
| 6,324,739 B1 | 12/2001 | Fujii |
| 6,334,632 B1 | 1/2002 | Nishio |
| 6,513,839 B2 | 2/2003 | Nishio |
| 6,517,123 B2 | 2/2003 | Nishio |
| 6,550,119 B2 | 4/2003 | Ishida |

(Continued)

FOREIGN PATENT DOCUMENTS

| | | |
|---|---|---|
| CN | 104024714 A | 9/2014 |
| DE | 69727342 T2 | 1/2005 |

(Continued)

OTHER PUBLICATIONS

Fit-Line, Inc., "High Purity PFA and PVDF Fittings," Fit-Line Catalog, 2017, USA.

(Continued)

*Primary Examiner* — Christopher T Schatz
(74) *Attorney, Agent, or Firm* — DANE IP Law PC

(57) ABSTRACT

A method and apparatus for assembling a high purity liquid distribution system is described. A distal end portion of the tube is heated then pushed over a sleeve so that the distal end portion can have a shrink seal fit over the sleeve to mitigate accidental or inadvertent pull out of the tube from a fitting. Other benefits are also achieved such as minimal flow restriction of the liquid flowing through the joint and the tube.

10 Claims, 24 Drawing Sheets

(56) References Cited

U.S. PATENT DOCUMENTS

| | | |
|---|---|---|
| 6,776,440 B2 | 8/2004 | Nishio |
| 6,991,266 B2 | 1/2006 | Nishio |
| 7,314,239 B2 | 1/2008 | Okamoto |
| 7,530,602 B2 | 5/2009 | Fujii |
| 7,565,065 B2 | 7/2009 | Kato |
| 7,695,026 B2 | 4/2010 | Okamoto |
| 7,931,307 B2 | 4/2011 | Fujii |
| 9,074,708 B2 | 7/2015 | Fujii |
| 9,109,728 B2 | 8/2015 | Teshima |
| 9,151,427 B2 | 10/2015 | Imanishi |
| 9,222,608 B2 | 12/2015 | Teshima |
| 9,644,774 B2 | 5/2017 | Imanishi |
| 2002/0042979 A1 | 4/2002 | Ishida |
| 2002/0167169 A1 | 11/2002 | Nishio |
| 2002/0167170 A1 | 11/2002 | Nishio |
| 2002/0180211 A1 | 12/2002 | Nishio |
| 2003/0085569 A1 | 5/2003 | Nishio |
| 2011/0210544 A1 | 9/2011 | Teshima |
| 2011/0221190 A1 | 9/2011 | Teshima |
| 2011/0260450 A1 | 10/2011 | Imanishi |
| 2013/0038053 A1 | 2/2013 | Imanishi |
| 2015/0017276 A1 | 1/2015 | Hayes, Jr. |
| 2016/0061357 A1 | 3/2016 | Fujii |
| 2016/0061361 A1 | 3/2016 | Fujii |
| 2016/0076686 A1 | 3/2016 | Fujii |
| 2017/0146161 A1 | 5/2017 | Fujii |
| 2017/0159854 A1 | 6/2017 | Fujii |
| 2017/0299097 A1 | 10/2017 | Fujii |
| 2017/0307118 A1 | 10/2017 | Fujii |
| 2019/0368644 A1 | 12/2019 | Hayes, Jr. |

FOREIGN PATENT DOCUMENTS

| | | |
|---|---|---|
| DE | 60013015 T2 | 8/2005 |
| DE | 60205533 T2 | 3/2006 |
| DE | 69932556 T2 | 10/2007 |
| EP | 0496068 A1 | 7/1992 |
| EP | 0530413 B1 | 5/1995 |
| EP | 0823578 A2 | 2/1998 |
| EP | 0903529 A2 | 3/1999 |
| EP | 0915283 A2 | 5/1999 |
| EP | 0823578 A3 | 7/1999 |
| EP | 0903529 A3 | 7/1999 |
| EP | 0945664 A2 | 9/1999 |
| EP | 1004515 A2 | 5/2000 |
| EP | 1041330 A1 | 10/2000 |
| EP | 1044757 A2 | 10/2000 |
| EP | 0945664 A3 | 1/2001 |
| EP | 1044757 A3 | 3/2002 |
| EP | 1199138 A2 | 4/2002 |
| EP | 1255068 A1 | 11/2002 |
| EP | 1262702 A1 | 12/2002 |
| EP | 0903529 B1 | 4/2003 |
| EP | 1199138 A3 | 9/2003 |
| EP | 0823578 B1 | 1/2004 |
| EP | 0915283 B1 | 8/2004 |
| EP | 1041330 B1 | 8/2004 |
| EP | 1477717 A1 | 11/2004 |
| EP | 1262702 B1 | 8/2005 |
| EP | 1653163 A1 | 5/2006 |
| EP | 0945664 B1 | 8/2006 |
| EP | 1477717 B1 | 1/2008 |
| EP | 1255068 B1 | 4/2010 |
| EP | 2322834 A1 | 5/2011 |
| EP | 2322835 A1 | 5/2011 |
| EP | 2372214 A1 | 10/2011 |
| EP | 2562458 A1 | 2/2013 |
| EP | 2698572 A1 | 2/2014 |
| EP | 2322835 B1 | 9/2014 |
| EP | 2698572 B1 | 9/2014 |
| EP | 2995839 A1 | 3/2016 |
| EP | 2995840 A1 | 3/2016 |
| EP | 3001086 A1 | 3/2016 |
| EP | 3203130 A1 | 8/2017 |
| EP | 3203131 A1 | 8/2017 |
| EP | 3249276 A1 | 11/2017 |
| EP | 3258153 A1 | 12/2017 |
| JP | H1194178 | 4/1999 |
| JP | H11230463 | 8/1999 |
| JP | 2949577 | 9/1999 |
| JP | H11280965 | 10/1999 |
| JP | 3044612 | 5/2000 |
| JP | 2000283372 A | 10/2000 |
| JP | 2000304171 | 11/2000 |
| JP | 2000310377 | 11/2000 |
| JP | 2001041364 | 2/2001 |
| JP | 3156051 | 4/2001 |
| JP | 3189095 | 7/2001 |
| JP | 2005030441 | 2/2005 |
| JP | 2005030442 | 2/2005 |
| JP | 2005291500 | 10/2005 |
| JP | 3865395 | 1/2007 |
| JP | 3865396 | 1/2007 |
| JP | 2009138867 | 6/2009 |
| JP | 2011127725 | 6/2011 |
| JP | 2011169384 | 9/2011 |
| JP | 2011226610 | 11/2011 |
| JP | 2011235547 | 11/2011 |
| JP | 2012102800 | 5/2012 |
| JP | 5496703 | 5/2014 |
| JP | 5520684 | 6/2014 |
| JP | 5555531 | 7/2014 |
| JP | 5613531 | 10/2014 |
| JP | 5622258 | 11/2014 |
| JP | 5883907 | 3/2016 |
| JP | 5923578 | 5/2016 |
| JP | 5923579 B2 | 5/2016 |
| JP | 2016070386 | 5/2016 |
| JP | 2016070387 | 5/2016 |
| JP | 2016070388 | 5/2016 |
| RU | 2503540 C2 | 1/2014 |
| WO | 2014181589 A1 | 11/2014 |
| WO | 2014181590 A1 | 11/2014 |
| WO | 2014181592 A1 | 11/2014 |
| WO | 2014181686 A1 | 11/2014 |
| WO | 2016052222 A1 | 4/2016 |
| WO | 2016052223 A1 | 4/2016 |

OTHER PUBLICATIONS

International Search Report and Written Opinion on related PCT application (PCT/US2020/033266) from International Searching Authority (RU) dated Aug. 20, 2020.
International Preliminary Report on Patentability for App. No. PCT/US2020/033266, dated Dec. 7, 2021, 6 pages.
Korean Office Action issued in App. No. KR1020217039594, dated Sep. 27, 2023, 4 pages.
Taiwan Examination Report dated Aug. 10, 2023, for Taiwan Patent Application No. 109116425 (4 pages).

METHOD AND APPARATUS TO ASSEMBLE A HIGH PURITY LIQUID DISTRIBUTION SYSTEM

CROSS-REFERENCE TO RELATED APPLICATIONS

This application is a divisional application of U.S. patent application Ser. No. 16/434,515, filed on 2019 Jun. 7, the entire contents of which is expressly incorporated herein by reference.

STATEMENT RE: FEDERALLY SPONSORED RESEARCH/DEVELOPMENT

Not Applicable

BACKGROUND

The various embodiments and aspects described herein relate to a method and apparatus for assembling a high purity liquid distribution system.

High purity liquid distribution systems require various tubes and other components to be connected to each other which control the flow of liquid use in the manufacture of semiconductors. The liquid distribution system operate at a high temperature and at pressures above atmospheric pressure, and thus have certain unique requirements. In assembling these types of high purity liquid distribution systems, certain deficiencies exists.

Accordingly, there is a need in the art for an improved method and apparatus for assembling high purity liquid distribution systems.

BRIEF SUMMARY

The various aspects described herein addresses the deficiencies in the art. For example, a machine for assembling a high purity liquid distribution system, tube, sleeve, fitting and a union nut is shown. Additionally, a method for assembling the high purity liquid distribution system utilizing the machine, tube, sleeve, fitting and union nut is described herein. The method and apparatus described herein allow for a shrink seal mating connection between the tube and sleeve for improved pullout strength of the tube when the joint has been assembled. Moreover, deformations in the joint are minimized in order to minimize fluid flow restrictions through the joint. Additionally, an inner diameter of the joint is the same before the union nut has been installed and after the union nut has been installed and removed from the fitting.

More particularly, a method of joining a tube fabricated from a PFA material to a sleeve which is fabricated from a PFA material is disclosed. The method may comprise the steps of heating a heating body to at least 15 degrees Celsius below a softening temperature of PFA material; disposing a distal end portion of the tube in a hole formed in the heating body until the distal end portion of the tube is in a pliable state; disposing a sleeve on a cylindrical post of a mandrel; gripping the tube with a hand; while gripping the tube with the hand, pulling the distal end portion of the tube out of the hole of the heating body; within 10 seconds after the removing step, pushing the distal end portion of the heated tube over the cylindrical post and the sleeve; within 10 seconds after the pushing step, removing the attached tube and sleeve immediately from the cylindrical post of the mandrel; allowing the distal end portion of the tube to remain in air which has a temperature between 15 degrees Celsius and 38 degrees Celsius until a temperature of the distal end portion of the tube is below 38 degrees Celsius.

The method may further comprise the step of reducing the inner diameter of the tube at a faster rate compared to an outer diameter of the tube to shrink the distal end portion of the tube onto the sleeve.

In the method, the pushing step may include the step of pushing the distal end portion of the heated tube until a distal end of the distal end portion of the tube contacts a stop flange of the sleeve.

In the method, a connection percentage between an inner surface of the tube and the outer surface of an enlarge portion of the sleeve and a reduced diameter cylindrical section of the sleeve may be equal to or greater than 75%. The connection percentage may be between 90% and 96%.

In the method, the removing step may be performed within 3 seconds after the pushing step.

In the heating step, the heating body may be heated to a temperature between 250 degrees Celsius and 290 degrees Celsius.

In another aspect, a machine for mounting a tube to a sleeve is disclosed. The machine may comprise a heating body with a hole having an inner diameter larger than an outer diameter of the tube and the hole having a depth greater than ¾ of a length of the sleeve; a heater in heat communication with the heating body to transfer heat to the heating body from the heater to raise a temperature of the heating body to about a softening temperature of the material of the tube; a controller in electrical communication with the heater and operative to turn the heater on and off; and a mandrel adjacent to the controller, the mandrel having a cylindrical post defining an outer diameter smaller than an inner diameter of the tube.

The mandrel may further have a retainer sleeve slidably disposed on a distal end portion of the cylindrical post between an engaged position and a disengaged position. In the engaged position, a plurality of arms may be spread outward to a greater extent from a central axis of the retainer sleeve and the cylindrical post compared to when the retainer sleeve is in the disengaged position.

In another aspect, a method of attaching a tube to a fitting is disclosed. The method may comprise the steps of providing the tube disposed over a sleeve, the sleeve and the tube when joined to each other defining mating pressing surfaces that extends between a base and apex of an enlarged portion of the sleeve and have a conical configuration, the mating pressing surfaces of the tube and the sleeve being connected to each other over at least 75% of a length of a conical surface of the sleeve; inserting the tube and the sleeve into the fitting; threading a nut onto a thread of the fitting so that a pressing surface of the nut contacts and pushes against an outer surface of the tube aligned to the mating pressing surfaces; torqueing down the nut onto the fitting; increasing the connection between the tube and the sleeve at the conical surface by torqueing down the nut onto the fitting to a predetermined level.

In the method, the increase of the increased connection may be at least 2%.

In the method, the connection percentage may be 98% or more after the nut is torqued down onto the fitting. In the method, the nut may be torqued onto the fitting to a level limited to an elastic limit collectively of the sleeve, tube and fitting so that if the nut is removed after the torqueing step, an inner diameter of the sleeve remains the same as before the nut was torqued onto the fitting.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

Figure 1:
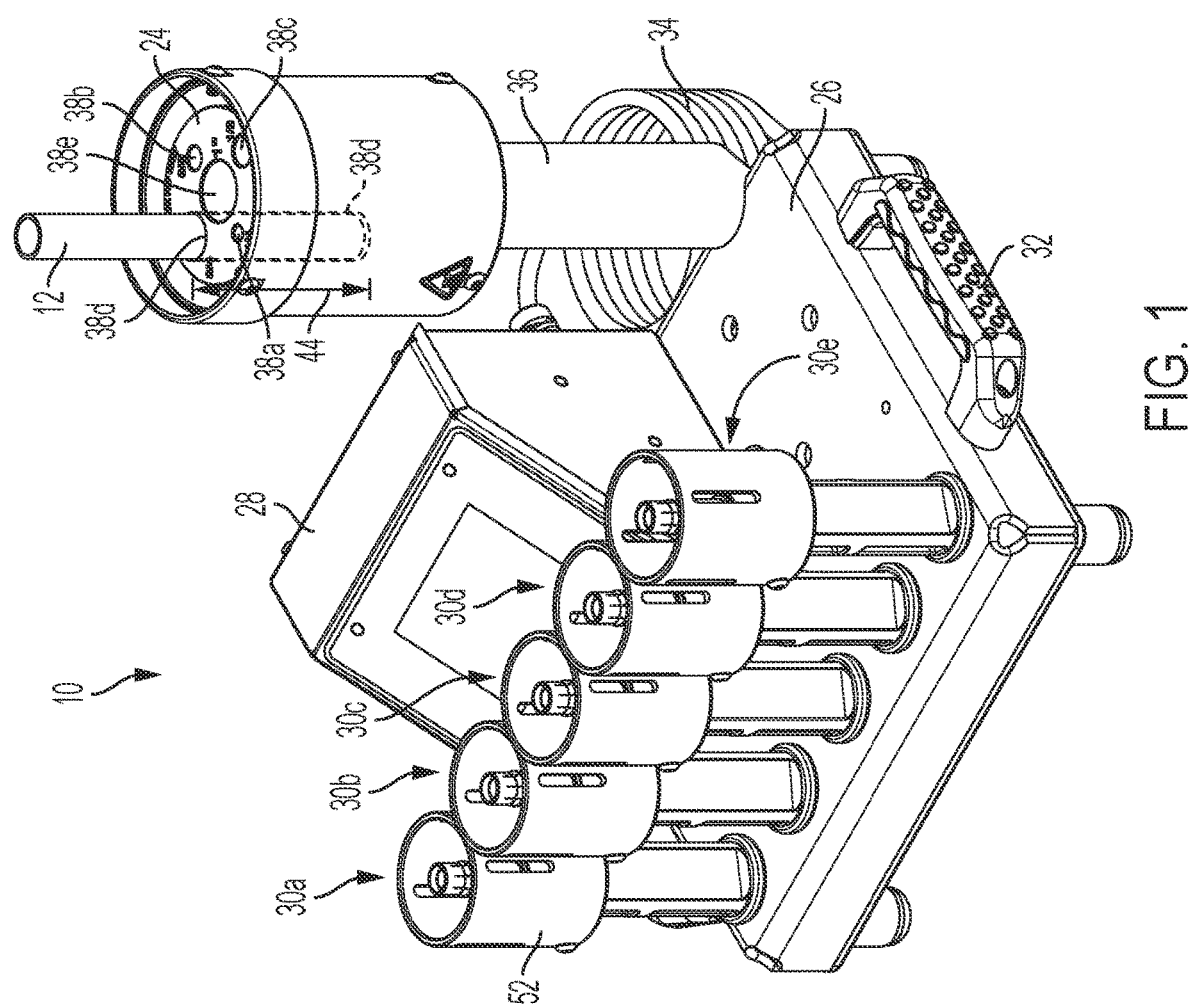
FIG. 1 is a perspective view of a heating machine for joining a tube and a sleeve.

Referring now to the drawings, various aspects including a heating machine 10 (see FIG. 1) for creating a joint 20 (see FIG. 12A) used in a high purity liquid distribution system is disclosed. The joint 20 may include a tube 12 (see FIGS. 12A, 15-15B) and a fitting 16 (see FIGS. 12A, 13-13B). The tube 12 may be attached to a sleeve 14 (see FIGS. 12A, 14-14B). The combined tube/sleeve 12, 14 may be attached to the fitting 16 with a union nut 18 (see FIGS. 12A, 16-16B). The joint 20 described herein may have a tube pull out force (i.e., force required to pull out the tube 12 from the fitting 16) that is sufficiently high to withstand the operating pressure and temperature of the high purity liquid distribution system. The high pull out strength of the joint 20 is accomplished by one or more of the following: attaching the tube 12 to the sleeve 14 after the tube is heated with the machine 10 and while the tube is in a stress relieved state (i.e., pliable state), cooling an inner surface 48 (see FIG. 15B) of the tube 12 at a faster rate compared to the outer surface 82 (see FIG. 15B) of the tube 12, and air cooling the combined tube 12 and sleeve 14 so that the combined tube/sleeve are in the stress relieved state after cooling. Moreover, the joint 20 does not significantly restrict liquid flow through the high purity liquid distribution system because the inner diameter of the joint 20 after the union nut 18 is torqued to a tightening level is not significantly less than the inner diameter 42 of the tube 12. The inner diameter of the joint may be about 0% to 5%, and more preferably 1% to 2% (e.g., 1.5%) smaller than the inner diameter of the tube after torqueing down the nut on the fitting. The minimal reduction in inner diameter of the joint 20 is accomplished by providing a pressure surface 132 (see FIG. 16B) of the union nut 18 having a wide area which applies pressure to the sleeve 14 over a wide area. Additionally, the nut 18 may be tightened onto the fitting 16 to a level where the joint 20 does not exceed its elastic limit. This means that the inner diameter of the joint 20 is same before the union nut 18 is tightened onto the fitting 16 to an operating torque and after the union nut 18 is removed from the fitting 16.

More particularly, referring now to FIG. 1, the machine 10 assists in connecting the tube 12 to the sleeve 14. The machine 10 may have a heating body 24. The heating body 24 may be in heat communication with the heater (not shown). The heater may heat the heating body 24 up to a temperature of 180 to 310 degrees Celsius when heating a tube 12 fabricated from FEP (fluorinated ethylene propylene) or PFA (perfluoroalkoxy) material. The heating body 24 may be attached to a base 26. The base 26 may also be used to secure a controller 28 and mandrels 30a-e. Handles 32 may be attached to the base 26 to allow the user to lift and move the machine 10 from location to location when assembling the high purity liquid distribution system. The controller 28 and the heater of the machine 10 may be powered by an electrical outlet which supplies electricity via an electrical cord 34.

The heating body 24 may be disposed in a vertical orientation. The heating body 24 may be attached to a post 36 which holds the heating body 24 in the upward direction. By the upward direction, it is meant that holes 38a-e may have a central axis that is vertically aligned. In this manner, the tube 12, which is to be inserted into one of the holes 38a-e, is also vertically aligned. The tube 12 that sits outside of the heating body 24 may be gripped by the person's hand, first to insert the tube 12 into the holes 38*a-e*, then after a distill end portion 40 of the tube 12 has reached a desired temperature, the user may then remove the tube 12 from the heating body 24 and push the distill end portion 40 (see FIG. 15B) of the tube 12 over the sleeve 14 which has been placed on one of the mandrels 30*a-e*.

Figure 15:
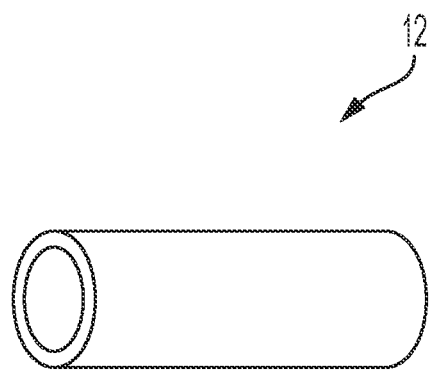
FIG. 15 is a perspective view of the tube.
Figure 15A:
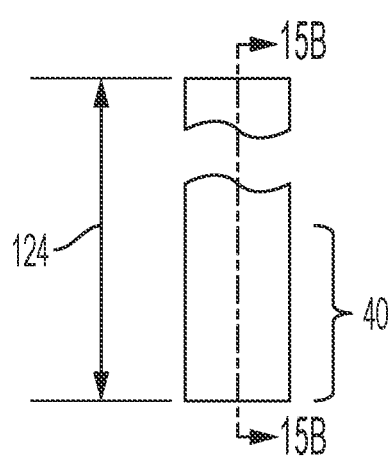
FIG. 15A is a front view of the tube.
Figure 15B:
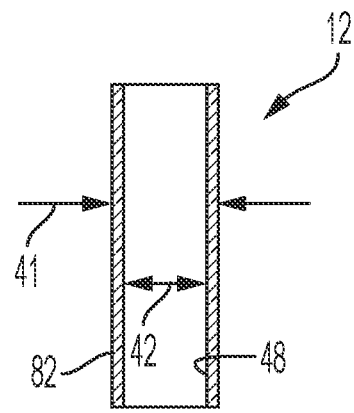
FIG. 15B is a cross-sectional view of the tube shown in FIG. 15A.

The tubes 12 may be provided in various sizes defined by its outer diameter 41 (see FIG. 15B). The tubes 12 may be provided in a quarter-inch outer diameter, a three-eighth inch outer diameter, a one-half inch outer diameter, a three-fourth inch outer diameter, a one-inch outer diameter and a one and one-half inch outer diameter. Other sizes in between these sizes are also contemplated. Each of these tube sizes may have a different inner diameter 44 (see FIG. 1). The holes 38*a-e* may have an inner diameter which is slightly larger (e.g., about 3 to 5% larger) than the outer diameter 41 of the tube 12. In this manner, the distill end portion 40 of the tube 12 may be inserted into the appropriate hole 38A-E. The inner diameter 42 of the tube 12 may be equal to and between 0.125 inches and 2 inches. By way of example and not limitation, the inner diameter 42 of a ¼ inch O.D. tube may be $5/32$ inch, the inner diameter 42 of a ⅜ inch O.D. tube may be ¼ inch, the inner diameter 42 of a ½ inch O.D. tube may be ⅜ inch, the inner diameter 42 of a ¾ inch O.D. tube may be ⅝ inch and the inner diameter 42 of a 1 inch O.D. tube may be $7/8^{th}$ inch.

By way of example and not limitation, the one-inch outer diameter tube 12 may be inserted into hole 38*e*, which may have an inner diameter slightly larger than 1 inch (e.g., ID of hole 38*e* may be about 1.01 inches). The ¼ inch hole, the ⅜ inch hole 38*b*, the ½ inch hole and the 0.75 inch hole 38*d* may have a slightly larger inner diameter between and equal to 0.005 to 0.010 inches greater than the outer diameters. The hole 38*a-e* may have a depth 44 (see FIG. 1), which is about equal to or about one-eighth of an inch greater than a sealing length 46 of the sleeve 14. The sealing length 46 of the sleeve 14 is the area about which the inner surface 48 (see FIG. 15B) of the tube 12 contacts when the tube 12 is engaged to the sleeve 14.

The heating body 24 may be fabricated from a metallic material. To insert the distill end portion 40 of the tube 12 into the hole 38, the user may grip the portion of the tube 12 which does not enter the hole 38 with his or her hand. The user pushes the distill end portion 40 into the appropriate hole 38*a-e*, waits until the distill end portion 40 is heated to the proper temperature, then pulls the distill end portion 40 of the tube 12 out of the hole 38*ae*.

To turn the heater which heats the heating body 24 on or off, the user may operate the controller 28. Additionally, via the controller, the user may increase or decrease the temperature of the heating body 24 to the appropriate temperature. The controller 28 may have buttons, knobs, pressure sensitive screen to control the heater. The heating body 24 may be heated to 160 degrees Celsius (i.e., between 140 degrees Celsius to 180 degrees Celsius) for a tube fabricated from an FEP material, and heated to about 270 degrees Celsius (i.e., between 250 degrees Celsius to 290 degrees Celsius) for a tube fabricated from a PFA material.

Referring now to FIGS. 2-4B, one of the mandrels 30*a-e* shown in FIG. 1 is represented in these figures. The mandrel 30 may be attached to the base 26 with a post 50. A protective sheath 52 (FIG. 1) may be attached to the post 50, with screws 54 to mitigate harm to the person. For example, if no sheath was used, then the heated tube 12 which would be above 200 degrees Celsius could be touched by the person assembling the joint 20 and burn the person. The sheath provides a protective barrier. Moreover, the sheath may also function as an insulator. As discussed herein, the inner surface 48 of the tube 12 cools down faster than the outer surface 82 of the tube 12. By placing a sheath 52 around the mandrel 30, the sheath 52 may act as an insulator to the outer surface 82 of the tube 12 to retain heat within the distal end portion of the tube. Although the sheath 52 is described as helping to facilitate faster slower cooling of the outer surface 82 of the tube compared to the inner surface 48 of the tube, the sheath is not a necessary component to facilitate faster cooling of the inner surface 48 compared to the outer surface 82. The coefficient of heat transfer of the post 67 (see FIG. 2B) and the sliding retained sleeve 64 (see FIG. 2B) may be sufficiently high so that even without the sheath 52, the inner surface 48 of the tube 12 cools down faster than the outer surface 82 of the tube 12 when the tube 12 and the sleeve 14 are cooled in ambient air having a temperature between 20 degrees Celsius and 44 degrees Celsius. The mandrels 30*a-e* shown in FIGS. 2-4B are shown without the sheath 52 for purposes of simplicity and clarity.

Figure 2A:
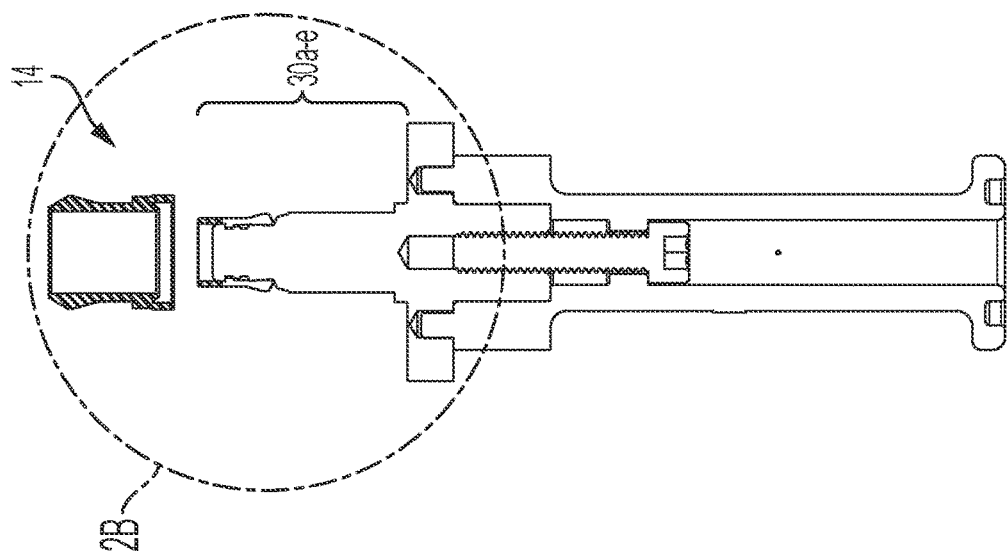
FIG. 2A is a cross-sectional view of the mandrel and sleeve shown in FIG. 2.
Figure 2:
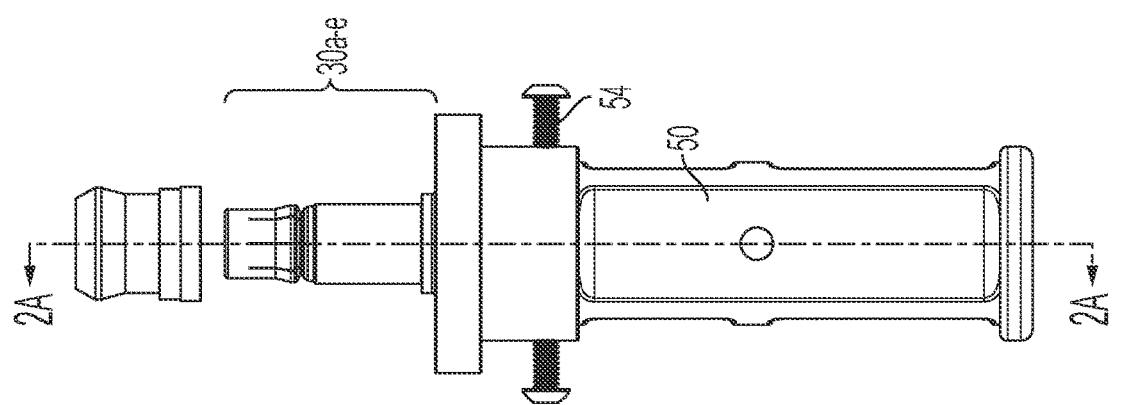
FIG. 2 is a front view of a mandrel which is shown in FIG. 1 with the sleeve disposed above the mandrel.
Figure 2B:
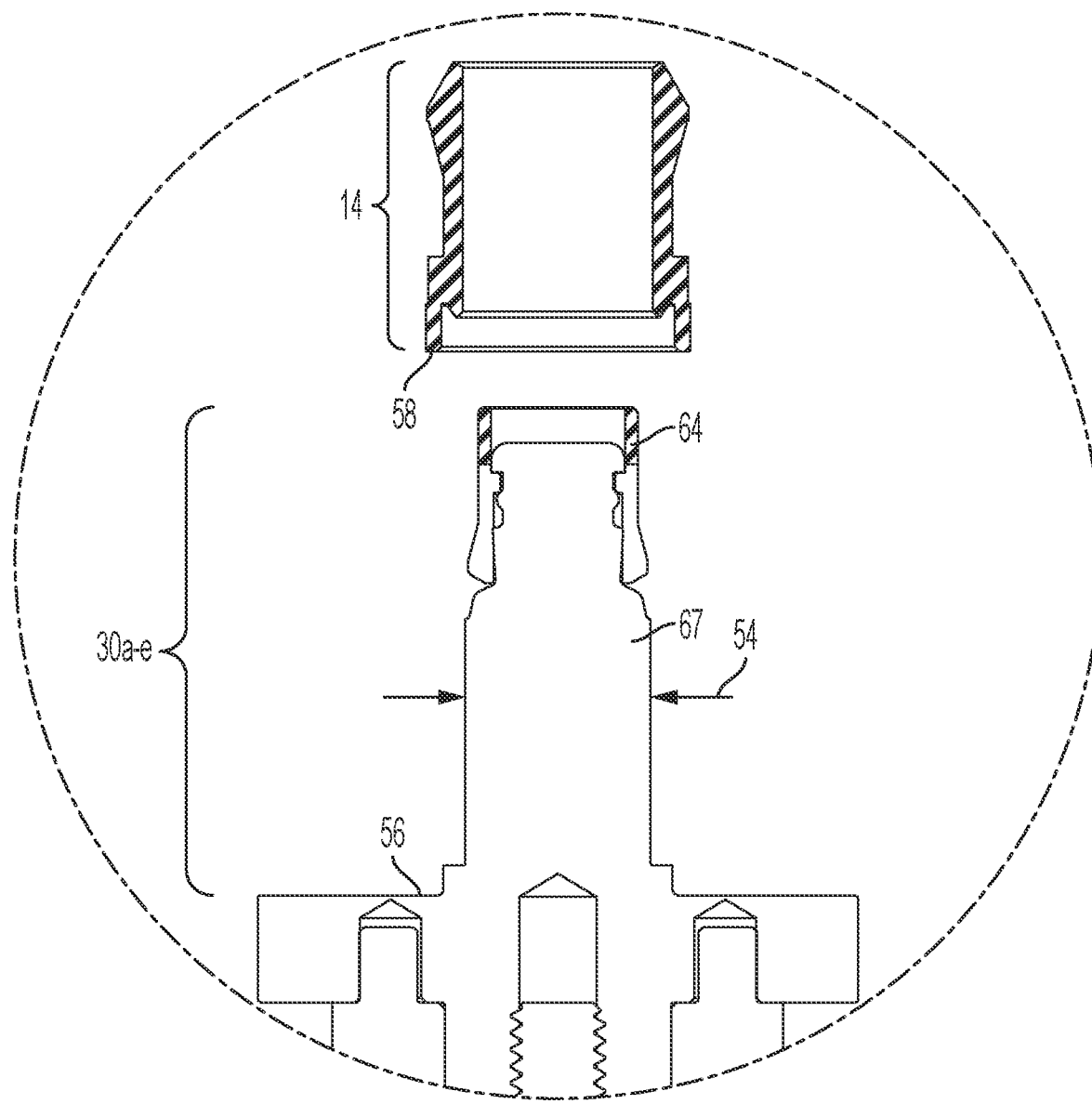
FIG. 2B is an enlarged view of the mandrel and sleeve shown in FIG. 2A.
Figure 3A:
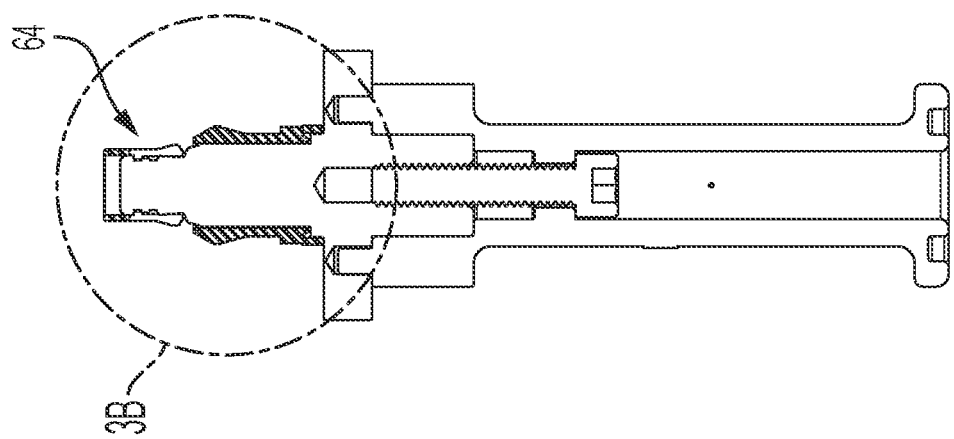
FIG. 3A is a cross-section of the mandrel and sleeve shown in FIG. 3.
Figure 3:
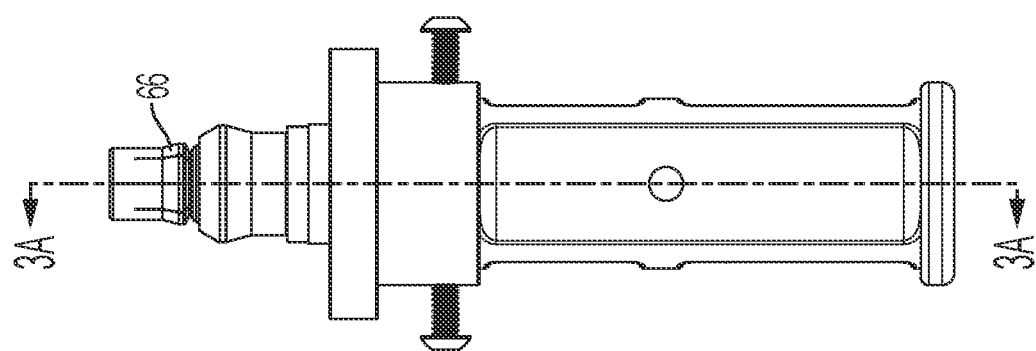
FIG. 3 is a front view of the mandrel with the sleeve disposed on the mandrel and a sliding retained sleeve in an up position.
Figure 3B:
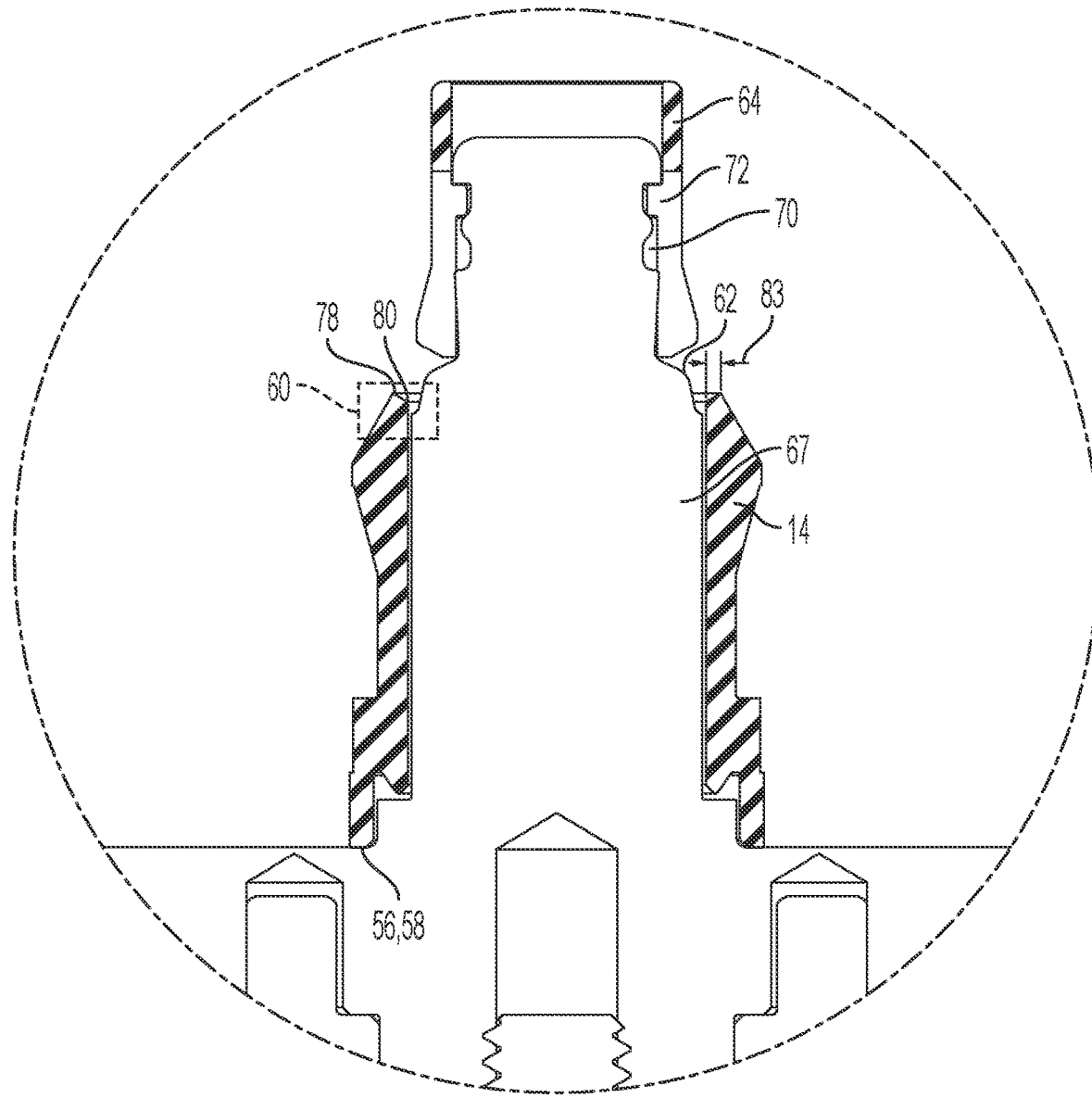
FIG. 3B is an enlarged view of the mandrel and sleeve shown in FIG. 3A.

The mandrels 30*a-e* may have an outer diameter 54 and a stopping surface 56, as shown in FIG. 2B. When the sleeve 14 is disposed over the mandrel 38*a-e*, as shown in FIG. 3B, a distal end 58 of the sleeve 14 (see FIG. 2B) contacts the stopping surface 56. In this position, the opposed end portion 60 of the sleeve 14 is aligned to a shoulder surface 62 of the mandrel 30*a-e*.

Figure 4A:
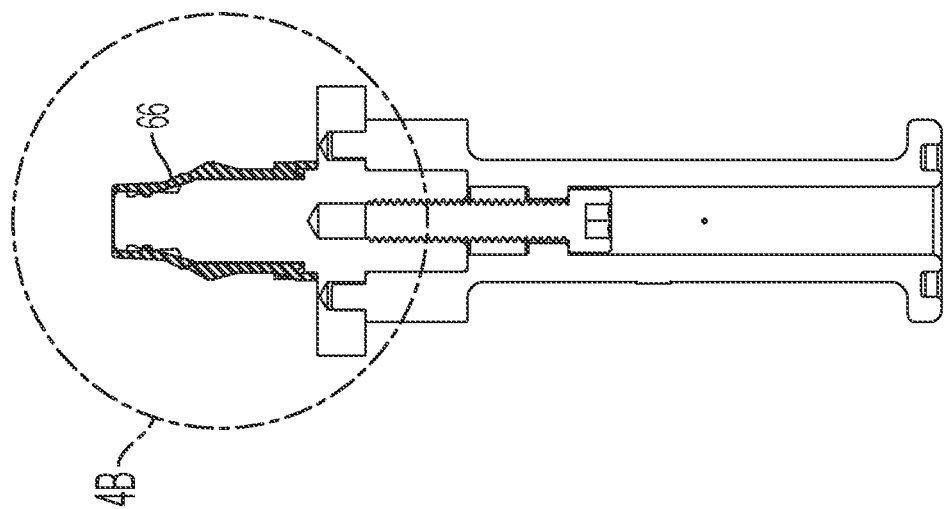
FIG. 4A is a cross-sectional view of the mandrel and sleeve shown in FIG. 4.
Figure 4:
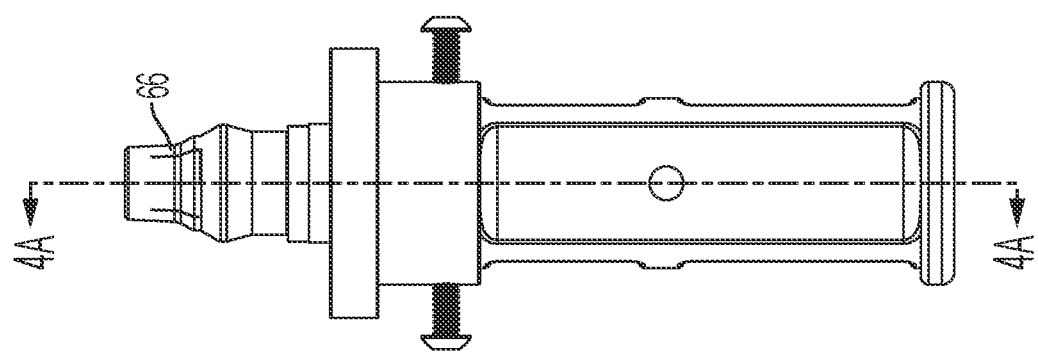
FIG. 4 is a front view of the mandrel and sleeve with the sliding retained sleeve in a down position.
Figure 4B:
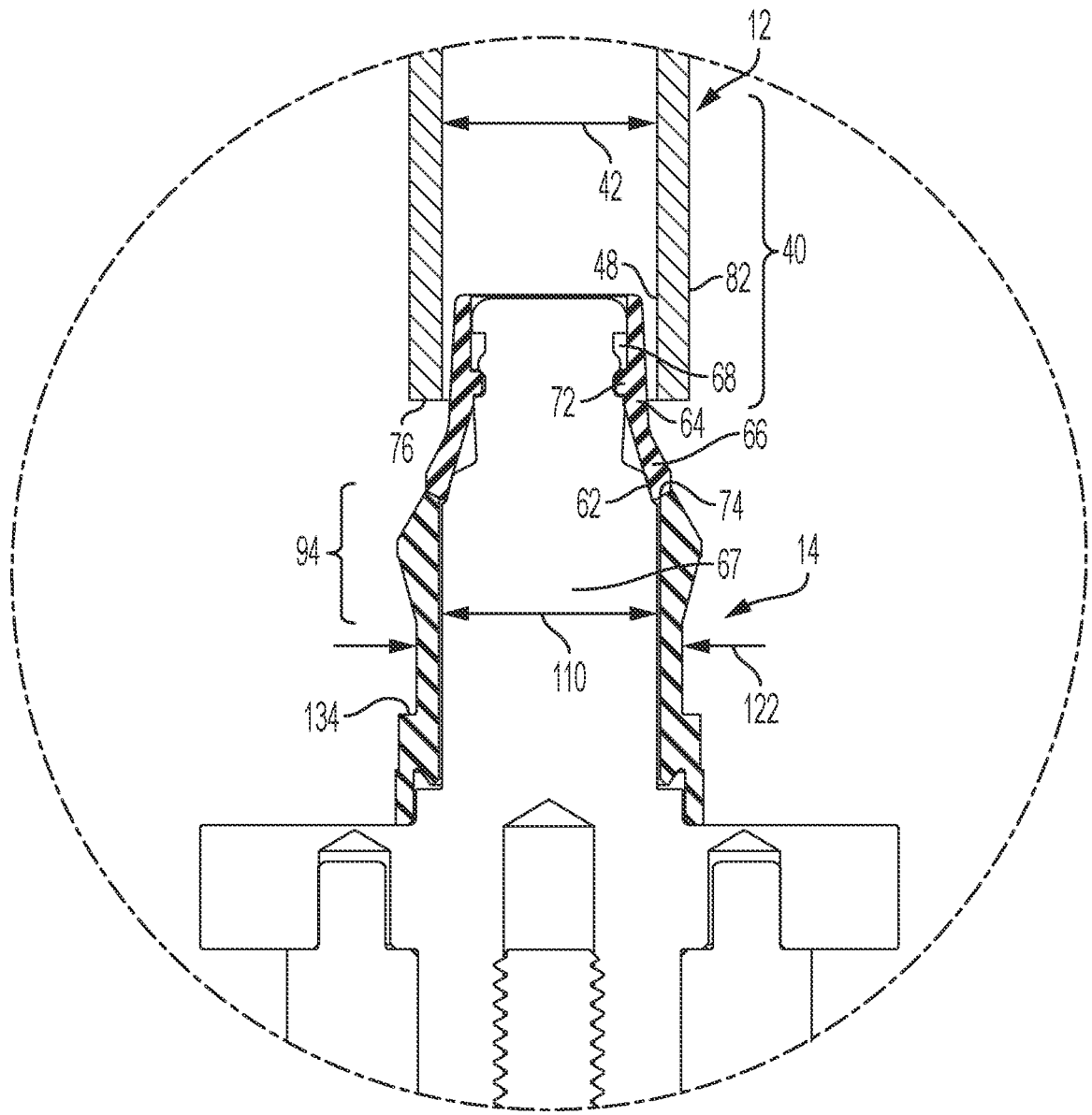
FIG. 4B is an enlarged view of the mandrel and sleeve shown in FIG. 4A with a tube disposed thereabove.
Figure 5:
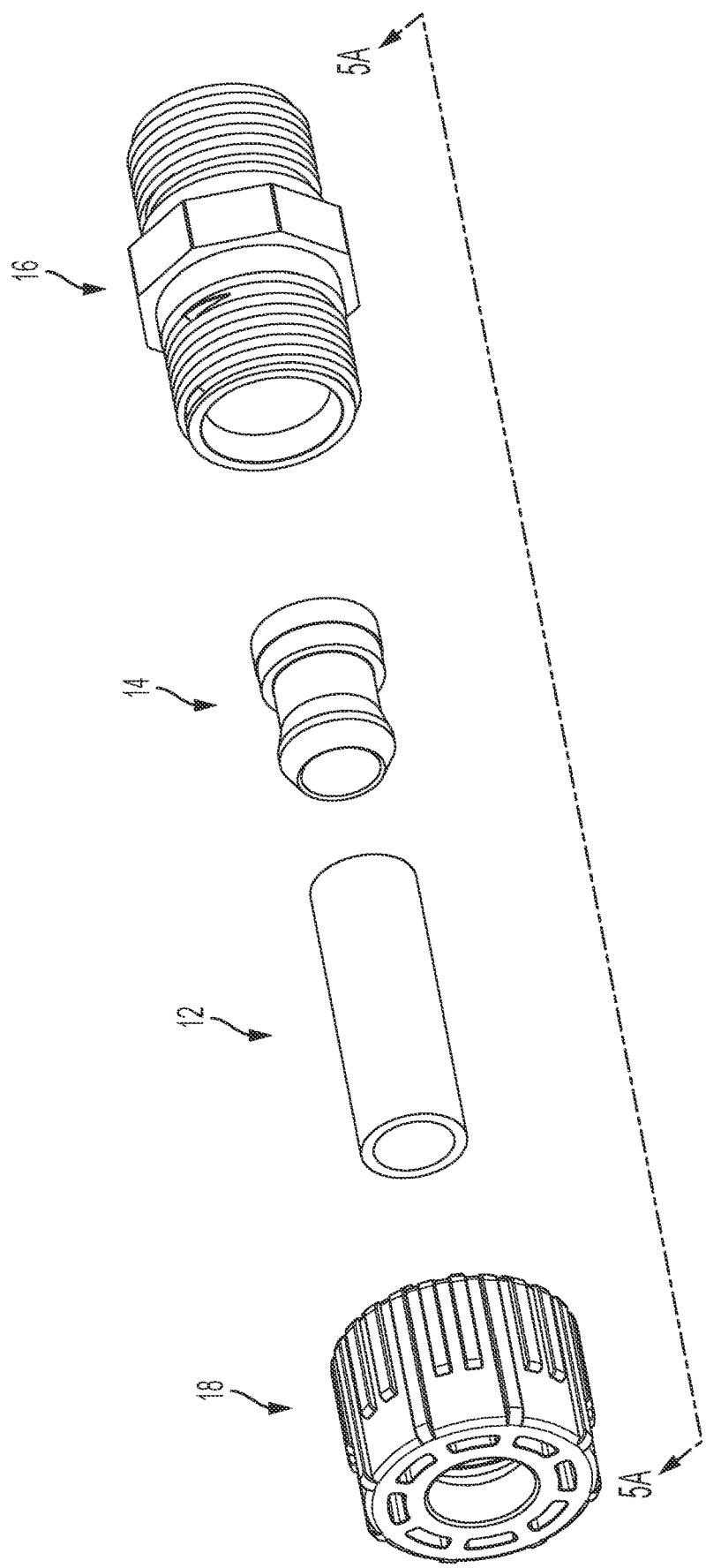
FIG. 5 is a perspective view of a union nut, tube, sleeve and fitting.
Figure 5A:
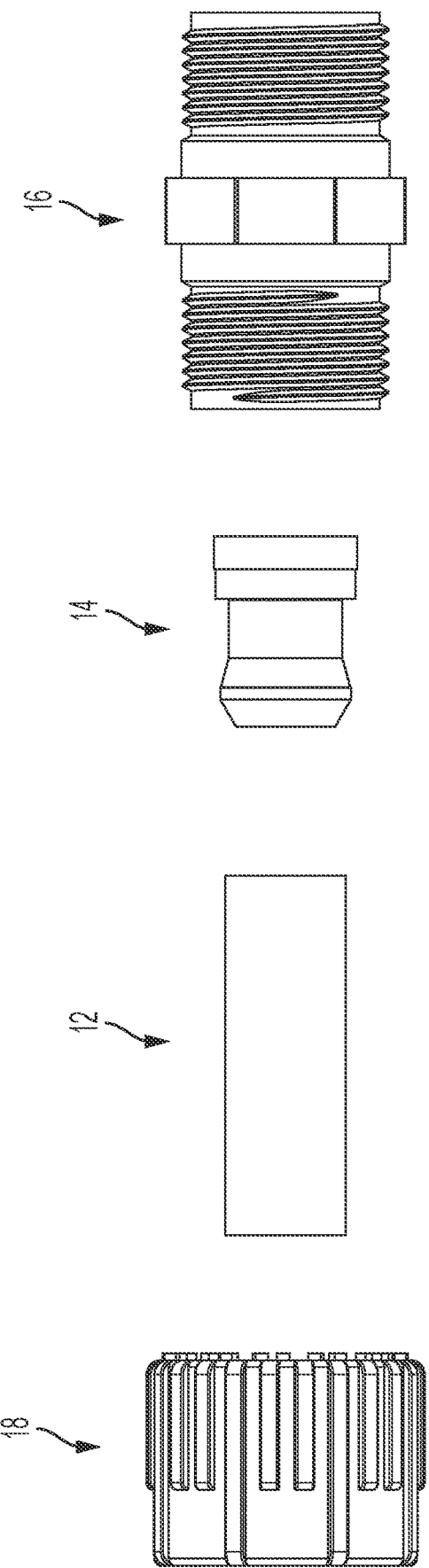
FIG. 5A is a front view of the union nut, tube, sleeve and fitting.

The mandrel 30*a-e* may have a sliding retained sleeve 64. The sliding retained sleeve 64 may be traversed to an up position, as shown in FIG. 3B, and a down position, as shown in FIG. 4B. The sliding retained sleeve 64 may have a plurality of arms 66 (see FIGS. 3 and 4) which spread apart, as shown in FIG. 4 when the sliding retained sleeve 64 is transitioned from the up position (see FIG. 3) to the down position (see FIG. 4).

A post 67 of the mandrel 30*a-e* may define the outer diameter 54, the shoulder surface 62 and a retaining catch. The retaining catch prevents removal of the sliding retained sleeve 64 off of the post 66 and defines the up position and the down position of the sliding retained sleeve 64. In particular, the post 66 may have an upper groove 68 (see FIG. 4B) and a lower groove 70 (see FIG. 3B). The sliding retained sleeve 64 may have a protrusion 72, which is received into the upper and lower groove 68, 70, when the sliding retained sleeve 64 is in the up and down positions. When the sliding retained sleeve 64 is in the down position, as shown in FIG. 4B, the arms 66 spread out because the shoulder surface 62 pushes the arms 66 outward.

In this down position, the distal end portions of the arms 66 reside within a gap formed by the chamfer 74 (see FIGS. 4B and 14B) and the shoulder surface 62 (see FIG. 4B). As such, when the tube 12 is being pushed over the sleeve 14, the distal end 76 of the tube 14 (see FIG. 4B) does not get caught or impeded on the edge 78 (see FIG. 3B) of the sleeve 14 because of the gap or lip 83 (see FIG. 3B) between the edge 78 and the inner diameter 80 (see FIG. 3B) of the sleeve 14. However, since the distal end portion of the arms 66 of the retained sleeve 64 butts up against the chamfer 74, any misalignment of the tube 12 to the sleeve 14 is corrected by the arms 66 shown in the position in FIG. 4B so that the distal end 76 of the tube 12 does not get caught on the edge 78 of the sleeve.

When the tube 12 is pushed over the sleeve 14, the inner surface of the tube contacts the outer surface of the sleeve. The heat from the inner surface of the tube is transferred out of the inner surface via this contact at a faster rate compared to the rate of heat from out of the outer surface of the tube.

The post 67 and the sliding retained sleeve 64 of the mandrel 30a-e, and the sleeve 14 may be capable of drawing heat away from the inner surface 48 of the heated distal end portion 40 of the tube 12 when the tube 12 is disposed over the sleeve 14 and on the post 67 at a greater rate compared to the outer surface 82 (see FIG. 15B) of the tube so that the inner surface 48 of the tube 12 may shrink at a faster rate compared to the outer surface 82 of the tube 12. The post 67 may be fabricated from a material that has a higher coefficient of heat transfer compared to air. By way of example and not limitation, the post 67 may be fabricated from a metallic material including, but not limited to aluminum. Moreover, the exterior surface of the post 67 may have a nickel alloy coating to further assist in the expeditious heat transfer of heat away from the inner surface 48 of the tube 12 and into the post 67 via the inner surface 48 of the tube 12. It is also contemplated that the sleeve 14 may be capable of drawing heat away from the inner surface of the distal end portion of the tube at a faster rate compared to the outer surface which is exposed to air.

Moreover, to facilitate heat transfer away from the inner surface 48 of the tube, the sliding retained sleeve 64 may be fabricated from the same material as the tube 12 and the sleeve 14. Preferably, the tube 12 and the sleeve 14 may be fabricated from either FEP (fluorinated ethylene propylene) or PFA (perfluoroalkoxy) materials. Although the tube 12 and the sleeve 14 may be fabricated from the same material, it is also contemplated that they 12, 14 may be fabricated from different materials including but not limited to the situation where the tube 12 may be fabricated from an FEP material, and the sleeve 14 may be fabricated from a PFA material, and vice versa.

Optionally, it is also contemplated that a thermoelectric cooler may also be attached to the post 67 to actively draw heat away from the post 67 to cool-down of the inner surface 48 of the tube 12 faster than the outer surface 82 of the tube. Also, it is also contemplated that heat sinks can be attached to the post 67 to further draw heat away from the post 67 so that the inner surface 48 cools down faster than the outer surface 82 of the tube 12.

The mandrel 38a-e is shown as having the sliding retained sleeve 64 for the purposes of mitigating the distal end 76 of the tube 12 from catching the edge 78 created by the chamfer 74 of the sleeve 14. However, it is also contemplated that the sleeve 14 may be fabricated without a chamfer 74 so that the opposed end portion 60 of the sleeve 14 has a sharp edge which is not gapped away from the outer surface of the post 67 by gap or lip 83. No lip 83 exists on the opposed end portion 60 of the sleeve 14 that might catch on the distal end 76 of the tube 12. In this regard, no sliding retaining sleeve 64 is necessary.

The sliding retained sleeve 64, the post 67, the sleeve 14 and the tube 12 may be cylindrical. The cross sections shown in the figures of these components may be characterized as illustrating any cross section through a central axis of the component 64, 67, 14 and 12. The same may be true for the union nut 18 and the fitting 16 except for the outer surface of the nut 18 and the threads formed thereon.

Figure 13:
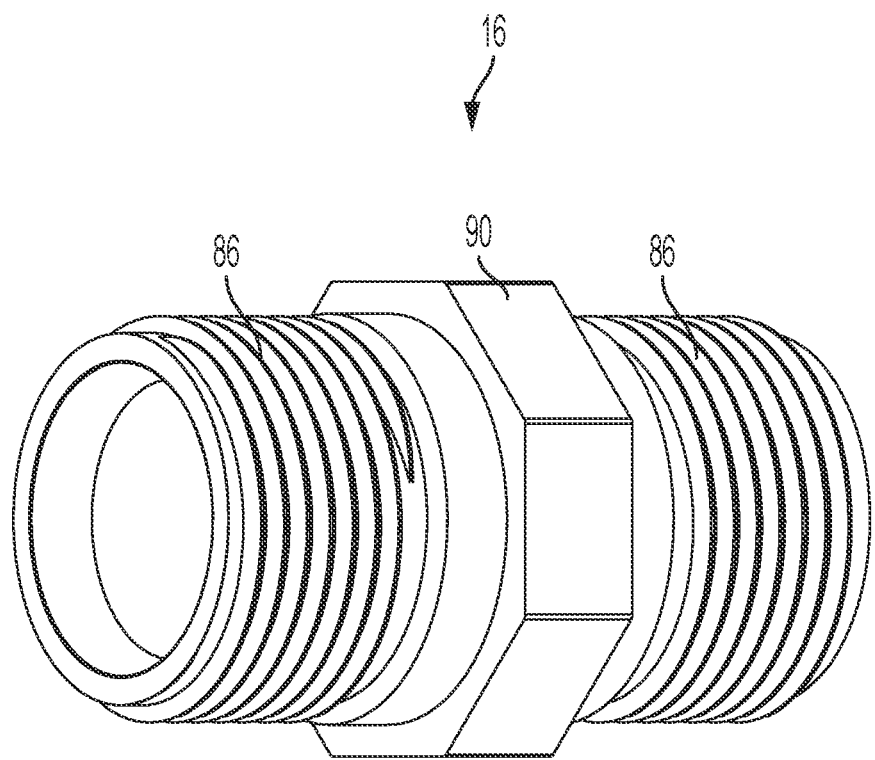
FIG. 13 is a perspective view of the fitting.
Figure 13A:
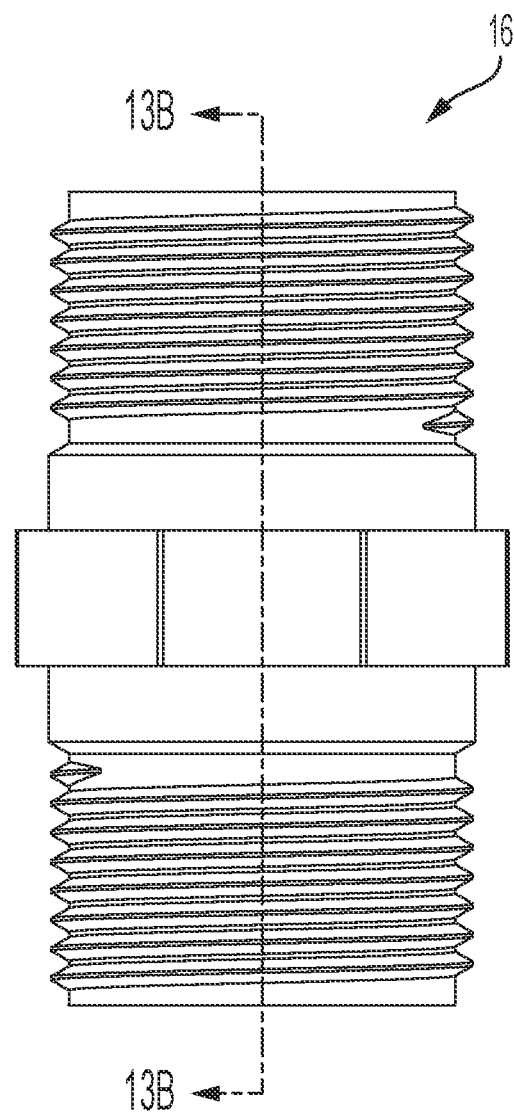
FIG. 13A is a front view of the fitting shown in FIG. 13.
Figure 13B:
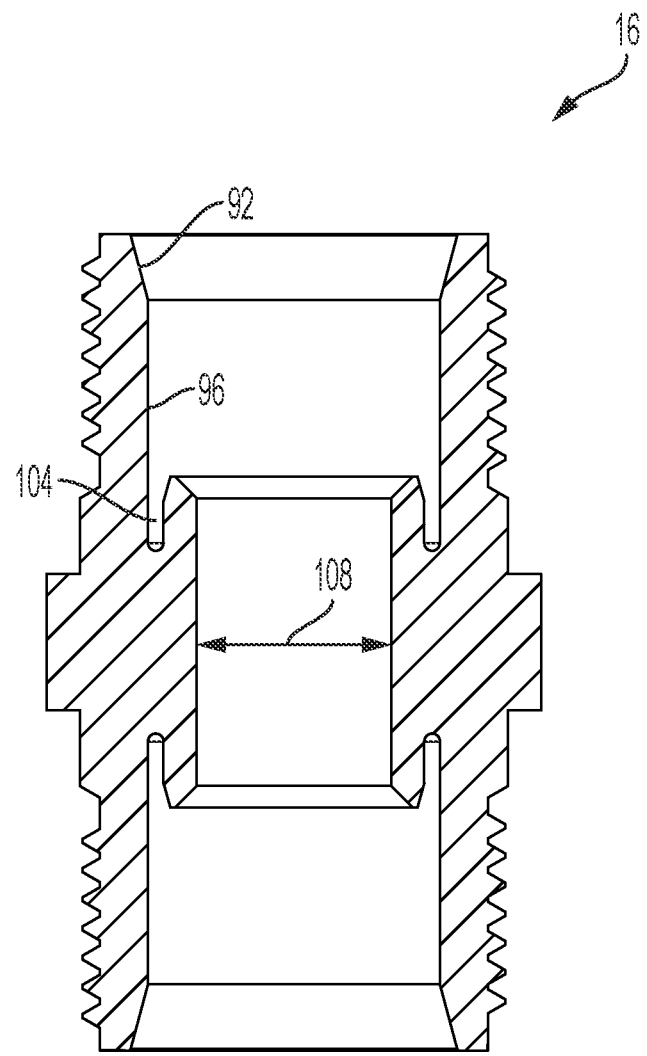
FIG. 13B is an enlarged cross-sectional view of the fitting shown in FIG. 13A.

Referring now to FIGS. 5 and 13-16B, the fitting 16, sleeve 14, tube 12 and union nut 18 are shown. The fitting 16, as shown in FIGS. 13-13B, may have thread(s) on opposed end portions of the fitting 16. However, it is also contemplated that the fitting 16 may have thread(s) 86 on only one side of the fitting 16, and on the other side of the fitting 16 may be a tubular structure such as an elbow, tube, valve or other configuration. The threads 86 of the fitting 16 may match the threads 88 (see FIG. 16B) of the union nut 18. The fitting 16 may also have a wrenching surface 90 to assist in keeping the fitting 16 still while tightening the union nut 18 onto the fitting 16.

Figure 12:
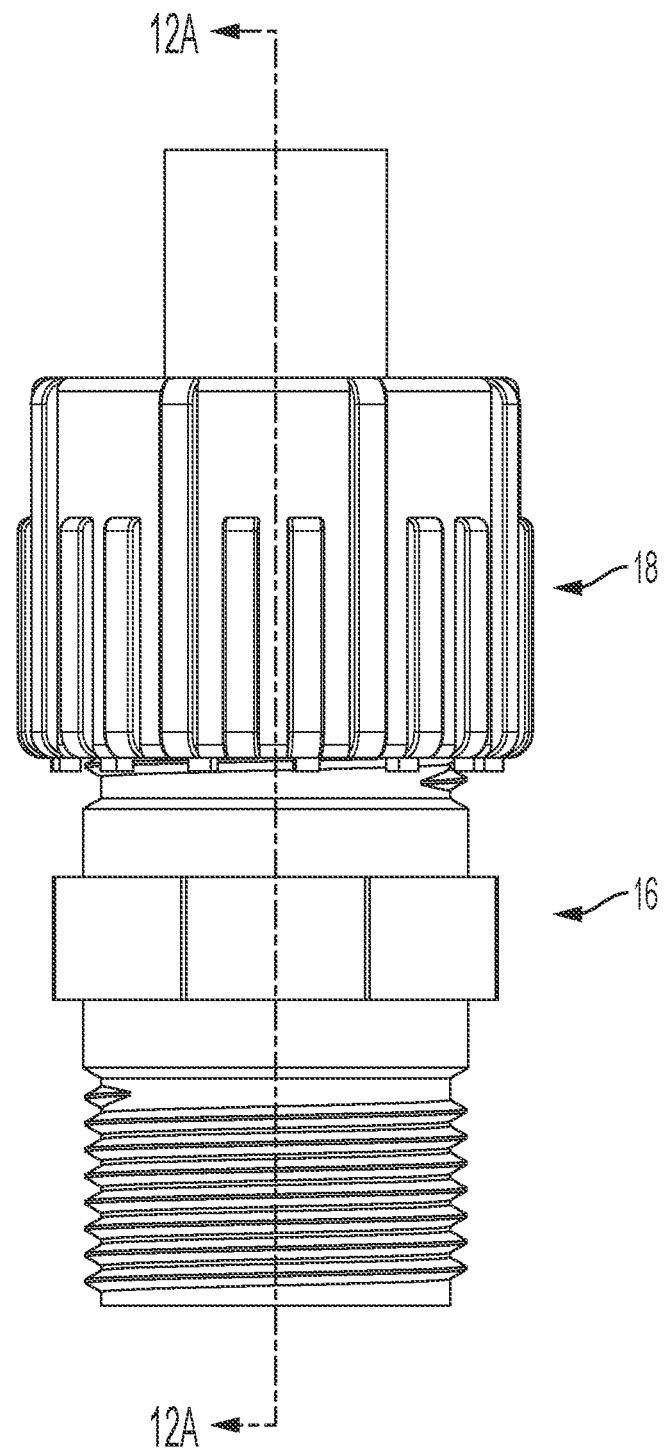
FIG. 12 is an upright view of the assembly shown in FIG. 11.
Figure 12A:
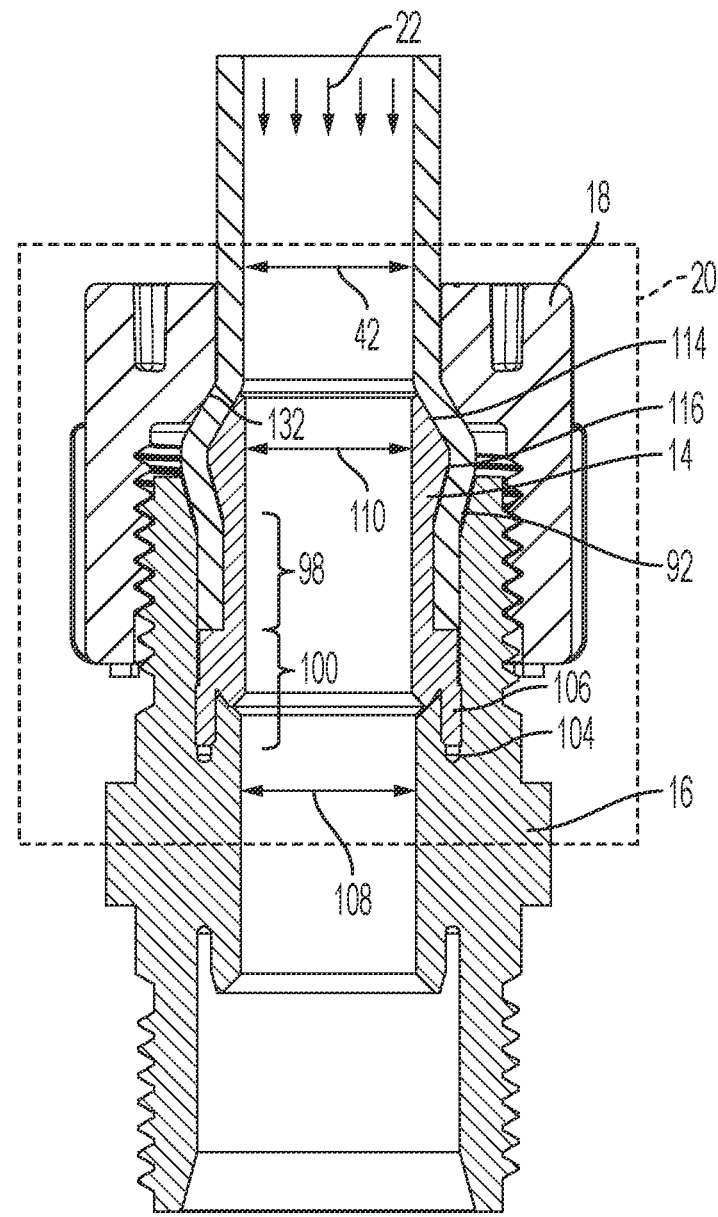
FIG. 12A is a cross-sectional view of the assembly shown in FIG. 12.

Referring now to FIG. 13B, the fitting 16 may have a chamfered surface 92, which accommodates the tube 12 which is outwardly flared due to an enlarged portion 94 (see FIG. 14B) of the sleeve 14. The chamfered surface 92 of the fitting may be at the same angle as conical surface 116 of the sleeve 14. The fitting 16 may also have a straight cylindrical surface 96, which receives a straight portion 98 (see FIG. 12A) of the tube 12 and a straight portion 100 (see FIG. 12A) of the sleeve 14. FIG. 14B illustrates the straight section 100 of the sleeve 14. The straight section 100 may also have a step 102. Nevertheless, even with the step 102, the straight section may still be considered straight. The fitting 16 may also have a recess 104, which receives a protrusion 106 (see FIG. 14B) of the sleeve 14. This fitting 16 may also define an inner diameter 108 which may be equal to an inner diameter 42 (see FIG. 15B) of the tube 12. When assembled, as shown in FIG. 12A, the fluid 22 that flows through the tube 12 also flows through the sleeve 14 and the fitting 16. However, since the inner diameter 108 of the fitting 16 and an inner diameter 110 (see FIG. 14B) of the sleeve is equal to the inner diameter 42 of the tube 12, the fluid 22 maintains a laminar flow through the joint 20 and also does not experience any significant friction to the flow of liquid 22 therethrough.

Figure 14:
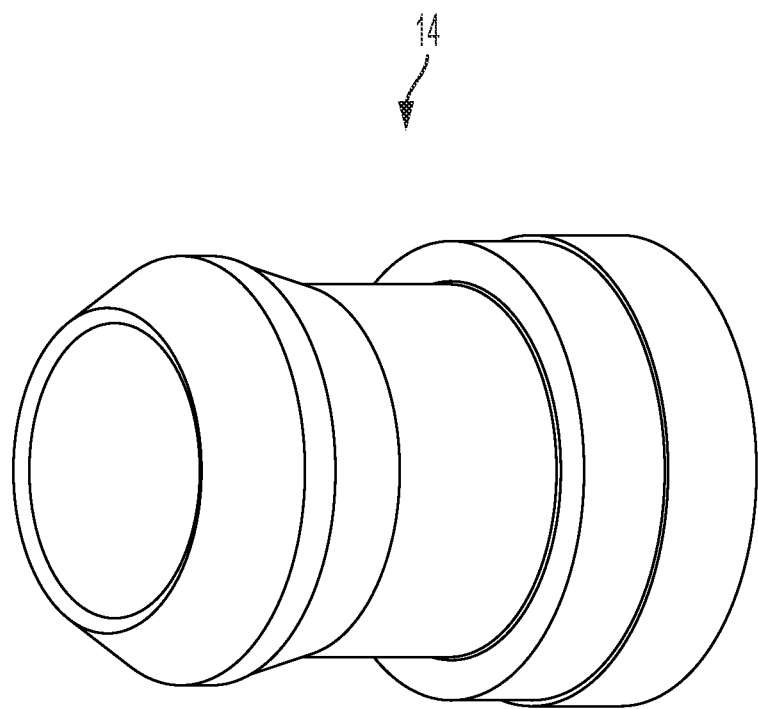
FIG. 14 is a perspective view of the sleeve.
Figure 14A:
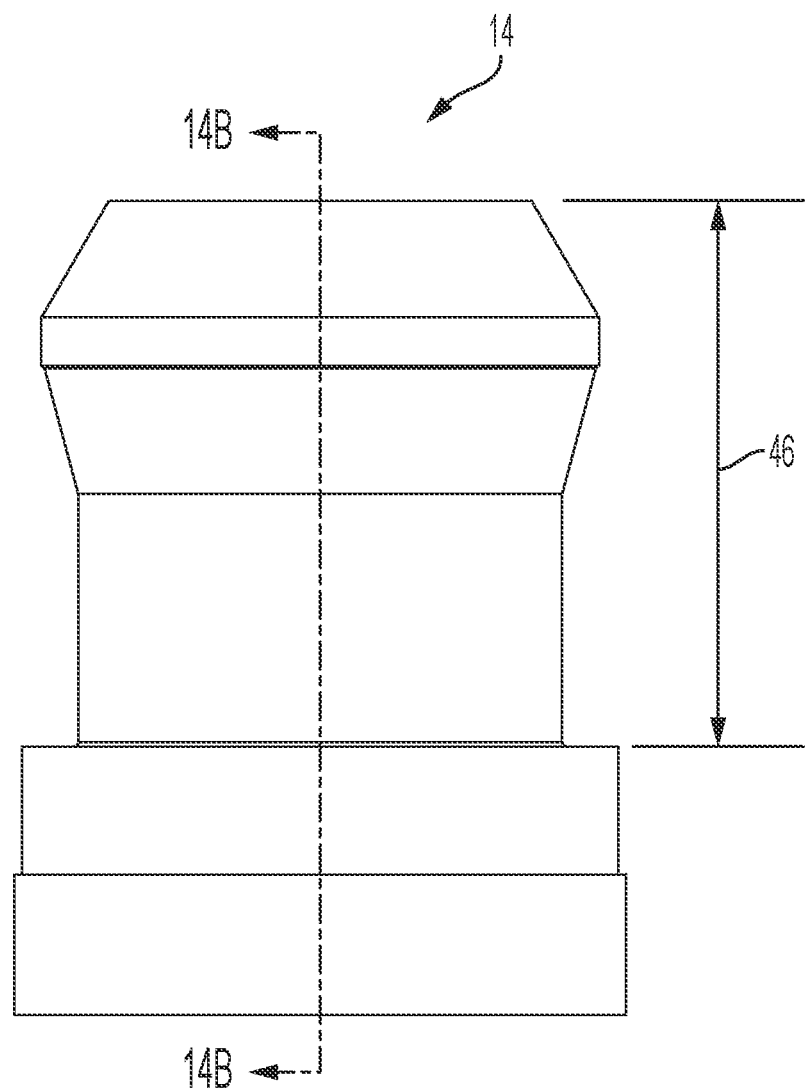
FIG. 14A is a front view of the sleeve shown in FIG. 14.
Figure 14B:
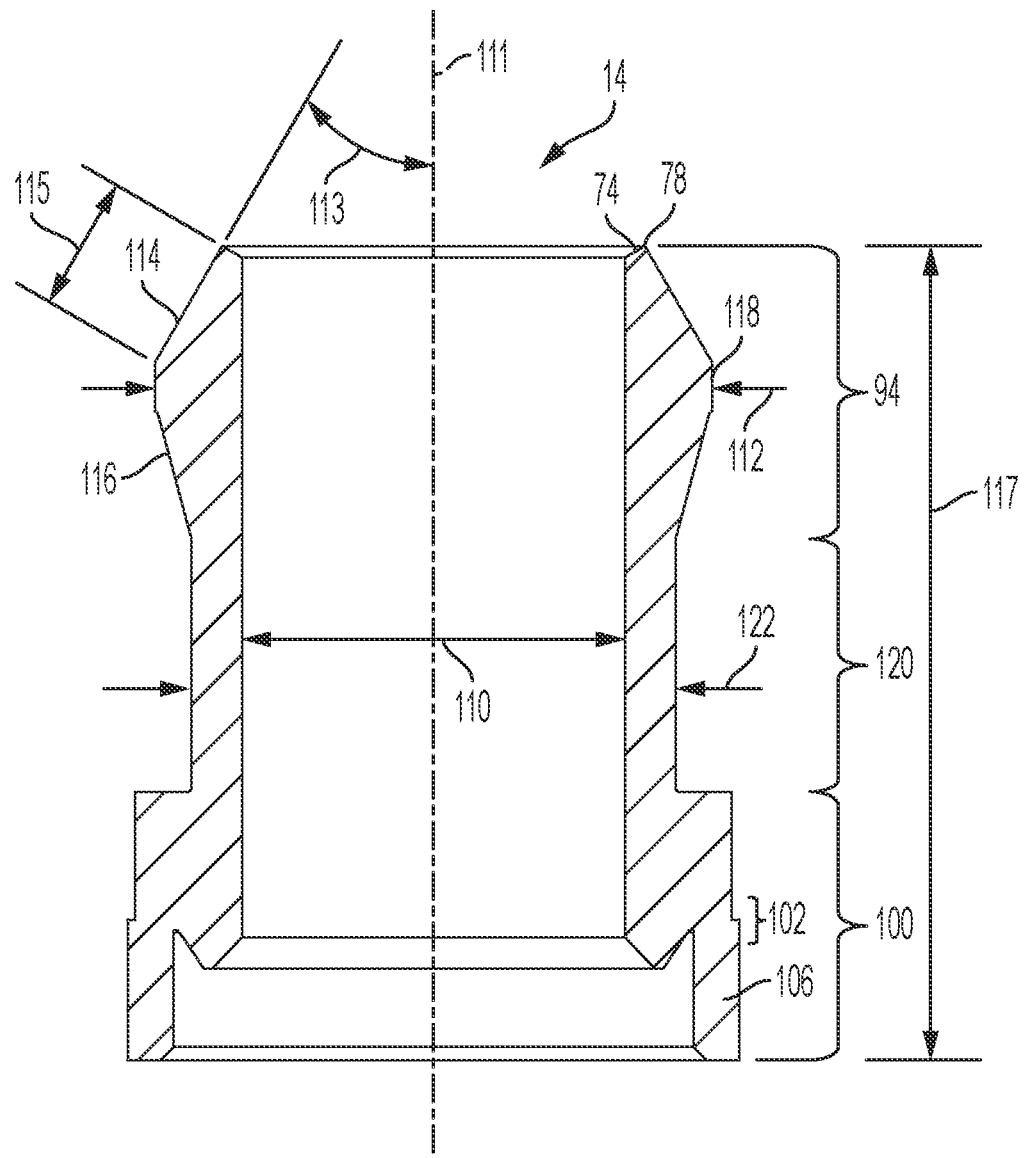
FIG. 14B is an enlarged cross-sectional view of the sleeve shown in FIG. 14A.

Referring now to FIG. 14-14B, the sleeve 14 is shown. The sleeve 14 defines an enlarged portion 94 having an outer diameter 112 at its apex. The apex may be a flat cylindrical surface. Moreover, the enlarged portion 94 may have two conical surfaces 114, 116. Conical surface 114 extends from the edge 78 to the cylindrical surface 118 of the apex. The conical surface 116 may extend from the apex of the enlarged portion 94 to a reduced diameter cylindrical section 120. The reduced diameter cylindrical section may have an outer diameter 112 which is smaller than the outer diameter 112 of the enlarged portion 94. As discussed herein, the chamfer 74 of the sleeve 14 is optional.

The conical surface 114 of the sleeve 14 may be referred to as the pressing surface. The conical surface 114 may be at an angle 113 (see FIG. 14B) equal to and between 10 degrees and 65 degrees from a central axis 111 (see FIG. 14B) of the sleeve 14. Preferably, the angle 113 may be at 15 degrees and 45 degrees (e.g., 30 degrees) from the central axis 111. A length 115 of the conical surface 114 may be equal to or between 10% to 27%, and more preferably 17% to 20% of a length 117 of the sleeve 14. By way of example and not limitation, length 115 of the conical surface 114 of the sleeve for a ¼ inch outer diameter tube is 0.090 inch, length 115 of the conical surface 114 of the sleeve for a ⅜ inch outer diameter tube is 0.127 inch, length 115 of the conical surface 114 of the sleeve for a ½ inch outer diameter tube is 0.132 inch, length 115 of the conical surface 114 of the sleeve for a ¾ inch outer diameter tube is 0.173 inch and length 115 of the conical surface 114 of the sleeve for a 1 inch outer diameter tube is 0.218 inch. The length 115 for tubes having different sized outer diameters may be sized to fit within the ratios described above. The length 115 of the conical surface 114 receives the force applied to it by the union nut over a wide area to distribute the load on the sleeve 14 and to mitigate inward deflection or a reduction of the inner diameter 110 of the sleeve 14 when the nut 18 is torqued onto the fitting 16. As shown in FIG. 12A, the union 18, as it 18 is being threaded onto the fitting 16, pushes the tube 12 against the pressing surface 114. In doing so, the sleeve 14 is urged further into the fitting 16. Moreover, the conical surface 116 presses against the tube 12, which also presses against the chamfered surface 92 of the fitting 16. In other words, the tube 12 is sandwiched between the chamfered surface 92 of the fitting 16 and the conical surface 116 of the sleeve 14, as shown in FIG. 12A. This forms a liquid-tight seal between the conical surface 116 and the inner surface of the tube that contacts it to prevent liquid 22 from flowing out of the joint 20. The conical surface 116 may have the same dimensions as the conical surface 114. The conical surface 116 may be a mirror configuration as the conical surface 114 or different but within the ranges stated herein for the conical surface 114.

Moreover, as discussed herein, the distal end portion 40 of the tube 12 is in a pliable state when the distal end portion 40 of the tube 12 is pushed over the enlarged portion 94 of the sleeve 14. In the pliable state, the distal end portion 40 of the tube is heated and its elastic range is increased. Plus, the stresses within the distal end portion 40 of the tube 12 is relieved. When the distal end portion 40 of the tube 12 is pushed over the enlarged portion 94, the stretching of the distal end portion 40 of the tube does not go beyond the elastic limit of the pliable distal end portion. Moreover, it is contemplated that the enlarged portion 94 may stretch the distal end portion 40 of the tube 12 beyond its elastic limit but not significantly so that the inner diameter 42 of the tube 12 would not go back down to the outer diameter 122 of the reduced diameter cylindrical section 120 of the sleeve 14 after the distal end portion 40 has cooled down. After the distal end portion 40 of the tube 12 has cooled down, the cooling of the distal end portion 40 of the tube and the elasticity of the distal end portion 40 of the tube may be sufficient to shrink down or reduce the inner diameter 42 of the tube so that the inner surface of the distal end portion 40 of the tube can compress upon the reduced diameter cylindrical section 120 and the conical surface 116 of the sleeve 14. The compression of the inner surface 48 of the tube on the sleeve 14 creates a connection where there is no gap along more than 75% and up to 95% (e.g., more preferably 90% to 95%) of a length of enlarged portion 94 and the reduced diameter cylindrical section 120 between the inner surface 48 of the tube and the outer surface of the sleeve 14. The tube 12 is not gaped away from the conical surface 116 of the sleeve 14. The distal end portion 40 of the tube 12 shrinks and elastically compresses onto the sleeve 14 to enhance the close connection between the distal end portion 40 and more particularly, the portion of the tube 12 that pushes against the conical surface 116 of the sleeve 14. To pull the tube 12 off of the sleeve 14, the elastic limit of the tube 12 would have to be exceeded. Hence, the pull out force of the tube 12 from the sleeve 14 is sufficiently high to withstand the operating conditions of the high purity liquid distribution system.

Referring now to FIGS. 15-15B, the tube 12 is shown. The tube 12 may have a length 124 which is sufficiently long so that the user can grip the tube with his or her hand and yet still insert the distal end portion 40 into the hole 38 of the heating body 24. It is also contemplated that in lieu of gripping the tube 12 with a person's hand, the tube may be gripped with a gripping device in the event that shorter tubes 124 are required to be installed in the high purity liquid distribution system.

Figure 16:
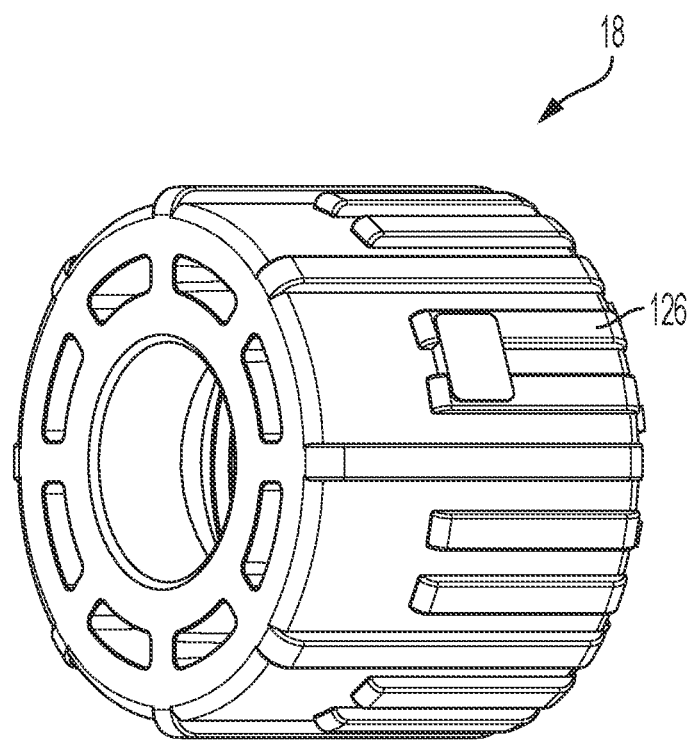
FIG. 16 is a perspective view of the union nut.
Figure 16A:
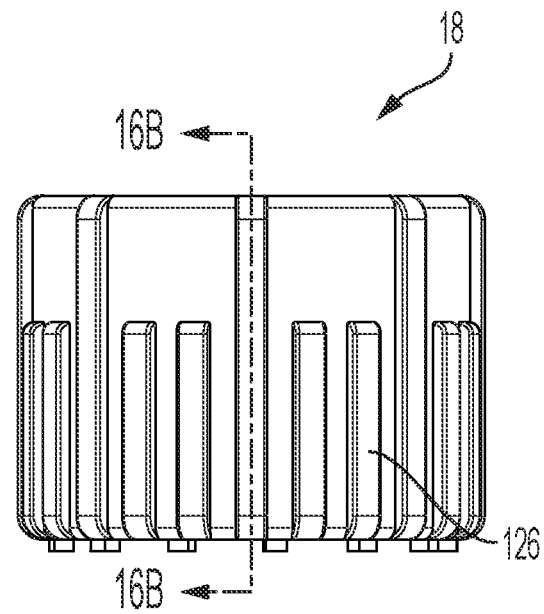
FIG. 16A is a front view of the union nut shown in FIG. 16.
Figure 16B:
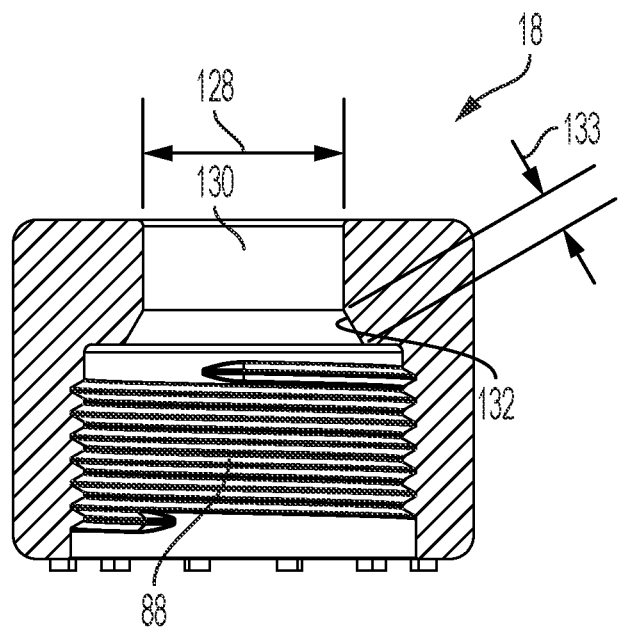
FIG. 16B is a cross-sectional view of the union nut shown in FIG. 16A.

Referring now to FIG. 16-16B, the union nut 18 is shown. The union nut 18 may have a castellated configuration on its exterior side. These castellated protrusions 126 aid in applying torque to tighten the nut 18 onto the fitting. The union nut 18 has an inner diameter 128 which is greater than an outer diameter 41 of the tube 12. This allows the tube 12 to be inserted into the hole 130 of the nut 18 during assembly of the joint 20. The union nut 18 also has a pressing surface 132. By way of example and not limitation, the length 133 of the pressing surface 132 is 0.079 inch for a ¼ inch outer diameter (O.D.) tube, 0.099 inch for a ⅜ inch O.D. tube, 0.099 inch for a ½ inch O.D. tube, 0.115 inch for a ¾ inch O.D. tube, 0.140 inch for a 1 inch O.D. tube. The length 133 (see FIG. 16B) for tubes having different sized outer diameters may be sized to fit within the ratios described above. By way of example and not limitation, the length 133 may be between 40% to 95% of the length 115 (see FIG. 14B) of the conical surface of the sleeve. More preferably, the length 133 may be 75% plus or minus 15% of length 115. The pressing surface 132 may have a conical configuration which may be at the same angle as the conical surface 114 (see FIG. 12A) of the sleeve 14. During assembly of the joint 20, the pressing surface 132 of the union 18 pushes against the exterior surface of the tube 12 at the location of the conical surface 114 of the sleeve 14. The distal end portion 40 of the tube 12 is heated so that it fits the contours of the sleeve 14. As such, the union nut 18 does not gouge into the exterior surface of the tube 12 and does not create stress concentrations on the tube 12. Moreover, the union nut 18 does not apply a sharp pin point pressure to the tube 12. Rather, the nut 18 via the pressing surface 132 transfers a force over a wide area to the sleeve to better distribute the pressure applied to the tube 12 and the sleeve 14. This causes less deformation of the sleeve 14, and thus results in a minimal interruption of the fluid flow 22 through the sleeve 14. Moreover, the connection percentage along a length of the enlarged portion and the reduced diameter cylindrical section 120 between the inner surface of the tube and the outer surface of the sleeve may increase more than 2% (e.g., 75% to 77%, 95% to 97%, or 90% to 95% to 92% to 97%) when the union nut 18 is torqued down onto the fitting 16. Preferably, the connection percentage between the inner surface of the tube and the outer surface of the sleeve along a length of the enlarged portion and the reduced diameter cylindrical section 122 may be increased so as to be 99% to 100% when the union nut 18 is torqued down onto the fitting 16.

To assemble the high purity liquid distribution system, tubes 12 are attached to sleeves 14. These sleeves 14 are used to attach the tubes 12 to various fittings 16 as is required in the high purity liquid distribution system. To mount the tube 12 to the sleeve 14, the user turns the heating machine 10 on to heat the heating body 24. The temperature of the heating body 24 is set to a temperature dependent on the type of material the tube 12 is fabricated from. The user can control the temperature of the heating body 24 via the controller 28 of the machine 10. Once the heating body 24 has been heated to the desired temperature, the user grips the tube 12 and inserts the distal end portion 40 of the tube 12 into the appropriate hole 38a-e. The heating body 24 then heats the distal end portion 40 of the tube 12 until the distal end portion 40 reaches a temperature equal to and between below 15 degrees Celsius of a softening temperature of the tube material and the melting temperature of the tube material. Preferably, the heating body 24 heats the distal end portion 40 of the tube 12 to at least the softening temperature of the tube material. At this point, the distal end portion 40 of the tube 12 may characterized as being in the pliable state. Normally, the distal end portion 40 of the tube 12 remains in the heating body 24 for about 45 seconds so that the temperature of the distal end portion 40 can reach the same temperature as the temperature of the heating body 24. When the distal end portion 40 of the tube 12 is in the pliable state, the inner and outer diameters of the tube 12 will increase about 3 to 4 percent. This makes it easier for the distal end portion 40 of the tube 12 to be pushed over the enlarged portion 94 of the sleeve 14. Moreover, the pliable state increases the elastic limit of the material so that when the distal end portion 40 of the tube 12 goes over the enlarged portion 94 of the sleeve 14, the stretching of the tube 12 over the enlarged portion 94 of the sleeve 14 does not exceed the elastic limit of the distal end portion 40 of the tube 12 in the heated condition. If the distal end portion 40 of the tube 12 does exceed its elastic limit when it 40 is pushed over the enlarged portion 94 of the sleeve, it is only slightly exceeded so that the distal end portion 40 of the tube 12 can elastically close down on the sleeve 14.

Once the distal end portion 40 of the tube 12 has reached the pliable state in the heating body 24 of the heating machine 10, the distal end portion 40 of the tube 12 is removed from the heating body 24. Before the distal end portion 40 of the tube 12 is removed from the heating body 24, the sliding retained sleeve 64 is traversed to the up position, as shown in FIG. 2B. The sleeve 14 is then disposed over the post 67 of the mandrel 30. A distal end 58 of the sleeve 14 contacts the stopping surface 56 of the mandrel 30, as shown in FIG. 3B. The sliding retained sleeve 64 is traversed to the down position, as shown in FIG. 4B. The tube 12 may be removed from the heating body 24 then inserted over the sleeve 14 as shown in FIG. 4B. Any misalignment of the tube 12 to the sleeve 14 may be corrected by arms 66 of the sliding retained sleeve 64 which are splayed outwardly and disposed within the chamfer 74 of the sleeve 14 and the shoulder surface 62, as shown in FIG. 4B.

The inner diameter 42 of the tube 12 is sized to be preferably equal to or between the inner diameter 110 of the sleeve 14 and the outer diameter 122 of the reduced diameter cylindrical section 120 of the sleeve 14. Preferably, the inner diameter 42 of the tube 12 is equal to the inner diameter 110 of the sleeve 14. As the distal end portion 40 of the tube 12 is inserted over the enlarged portion 94, the distal end portion 40 is stretched out. Because the distal end portion 40 is heated so as to be in a pliable state, the distal end portion 40 of the tube 12 has an increased range for its elastic limit. Hence, when the distal end portion 40 is stretched out because of the enlarged portion 94 of the sleeve 14, preferably it does not extend it excessively outside of the elastic limit of the distal end portion 40. More preferably, the distal end portion 40 remains within the elastic limit. When the distal end portion moves past the apex of the enlarged portion 94, the distal end portion 40 shrinks or closes back down due to its elasticity and compresses on the conical surfaces 114, 116 and the reduced diameter cylindrical section 120.

Moreover, the rate of heat transfer out of the inner surface 48 of the tube 12 is greater than the rate of heat transfer out of the outer surface of the tube 12 because the material of the post 67, the coating on the post 67, the material of the sliding retained sleeve 64 and the sleeve 14 itself is capable of transferring heat faster than air. In other words, the coefficient of heat transfer of these components collectively or as a system is greater than the coefficient of air. Because the inner surface 48 of the tube 12 cools down at a faster rate compared to the outer surface 82, the distal end portion 40 further shrinks down on the sleeve 14 to create a joint with close mating surfaces between the tube 12 and the sleeve 14. When the tube 12 is inserted over the sleeve 14, the distal end 76 of the tube 12 is inserted until the distal end 76 of the tube contacts a step surface 134 on the sleeve 14. Because the distal end portion 40 of the tube 12 is flexible, the user is able to push the tube 12 until the distal end 76 of the tube 12 contacts the step surface 134 of the sleeve 14. Also, because of the contact between the end surface 76 and the step surface 134, when the union nut 18 pushes the tube 12 and sleeve 14 further into the fitting 16, the force is transferred from the distal end 76 of the tube 12 into the step surface 134 to further help with the engagement of the assembly or joint assembly 20. Once the distal end portion 40 of the tube 12 is fully inserted over the sleeve 14, the user may wait between 1 to 3 seconds before removing the distal end portion 40 of the tube 12 and the sleeve 14 from the mandrel 30. The user lifts the tube 12 up to remove the sleeve 14 and tube 12 from the mandrel 30. When the user lifts up, the sleeve 14 pushes the sliding retained sleeve 64 upward to draw the arm 66 inward and allow the sleeve 14 to be removed from the mandrel 30. The distal end portion 40 of the tube 12 may then be air cooled before assembling the joint 20. Air cooling allows the distal end portion 40 of the tube and the sleeve 14 to be stress relieved after cooling. Once the distal end portion 40 is air cooled, there is a close mating contact between the inner surface 48 of the tube 12 and the outer surface of the sleeve 14. Moreover, the portion of the distal end portion 40 disposed between the apex of the enlarged portion 94 and the step surface 134 is reshaped into that configuration.

After the distal end portion 40 is cooled, the elastic limit of the distal end portion is now smaller. To remove the distal end portion 40 of the tube 12 off of the sleeve, the portion of the tube 12 between the apex of the enlarged portion 94 and the step surface 134 of the sleeve must be stretched larger. This is difficult to do because of the reduced elastic limit of the cooled distal end portion 40 of the tube 12. This helps to retain the tube 12 on the sleeve 14.

Figure 7:
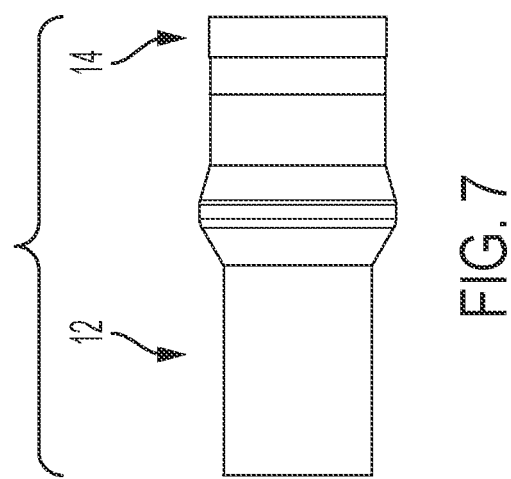
FIG. 7 is a front view of the tube and sleeve after they are attached to each other.
Figure 6:
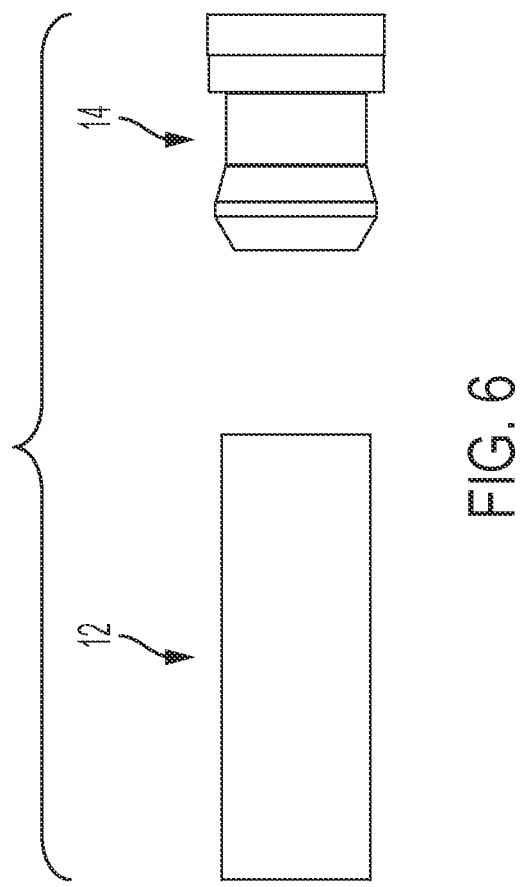
FIG. 6 is a front view of the tube and sleeve aligned to each other before being attached to each other.
Figure 9:
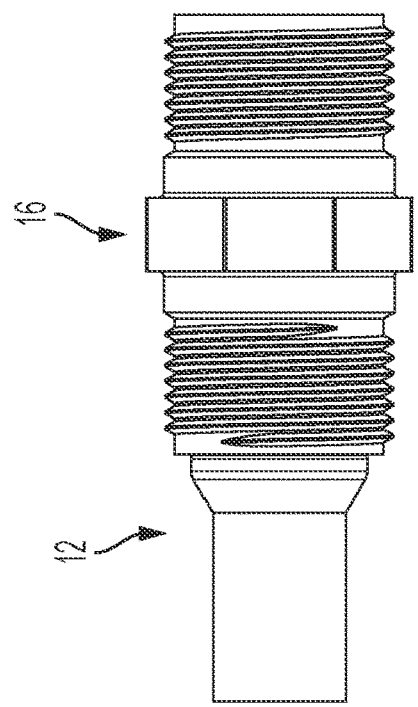
FIG. 9 is a front view of the joined tube and sleeve and the fitting after they are attached to each other.
Figure 8:
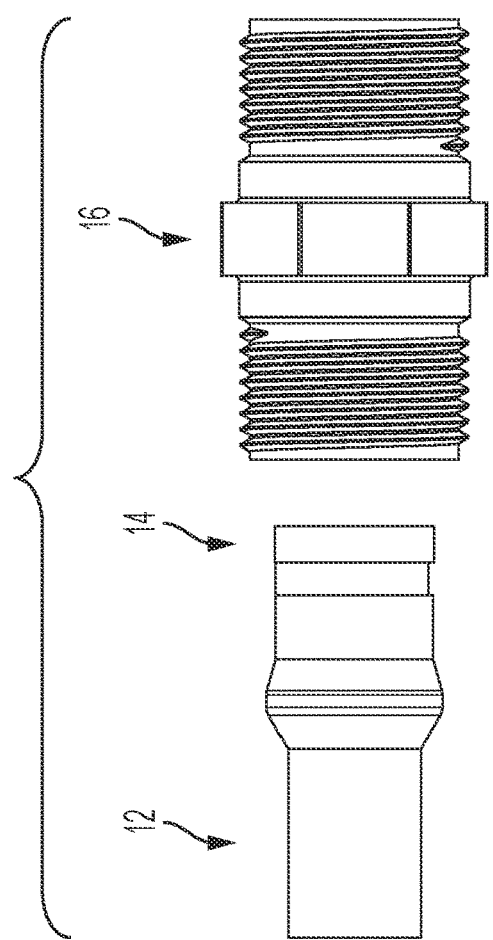
FIG. 8 is a front view of the joined tube and sleeve aligned to the fitting before being attached to each other.
Figure 11:
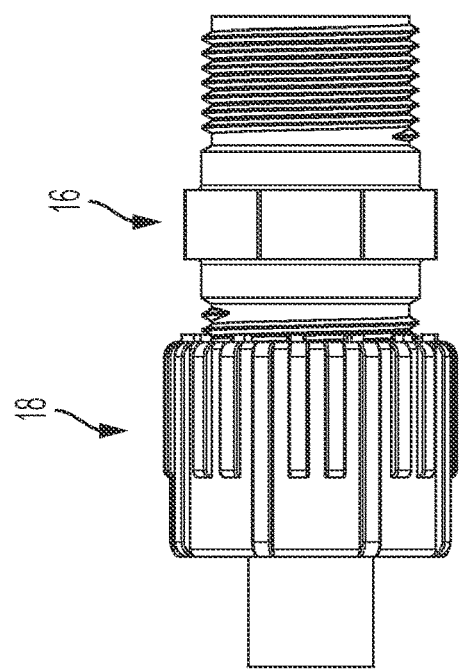
FIG. 11 is a front view of the union nut and the joined tube, sleeve and fitting after the nut is threaded onto the fitting shown in FIG. 10.
Figure 10:
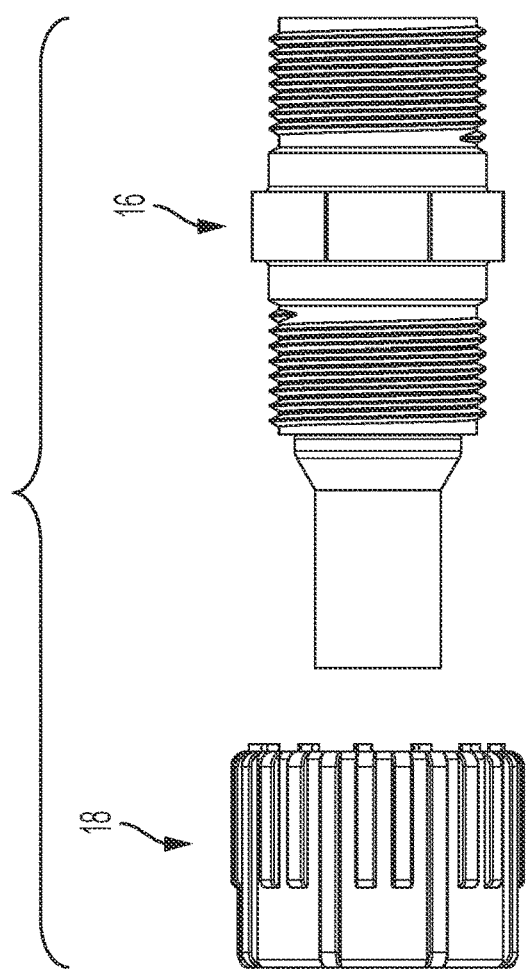
FIG. 10 is a front view of the union nut and the joined tube, sleeve and fitting before the union nut is attached to the fitting.

Referring now to FIGS. 5-12A, the assembly of the joint 20 is discussed. In particular, the distal end portion 40 of the tube 12 may be disposed over the sleeve 14, as discussed above. This is shown in FIGS. 6 and 7. After the tube 12 is attached to the sleeve 14, the sleeve 14 is inserted into the fitting 16, as shown in FIGS. 8 and 9. The protrusion 106 of the sleeve is inserted to the recess 104 of the fitting 16. (FIG. 12A). The union nut 18 may then be threaded onto the fitting 16 as shown in FIGS. 10 and 11.

A cross section of the joint 20 is shown in FIG. 12A. The union nut 18 may be torqued down to apply pressure to the sleeve 14 through the pressing surface 132 of the nut 18. The force is transferred through the tube 12 into the conical surface 114 of the sleeve 14. The axial directional component of such pressure applies the compressive force to the tube 12 between the chamfered surface 92 of the fitting 16 and the conical surface 116 of the sleeve 14 to create a liquid tight seal therebetween.

The pressing surface 132 of the union nut 18 also applies an inwardly directed force on the conical surface 114. The inwardly directed force is perpendicular to the axial direction. However, because the pressing surface 132 applies that force over a wide area, minimal inward deflection of the sleeve 14 occurs near the conical surface 114 of the sleeve 14. By way of example and not limitation, the inner diameter of the sleeve 14 would be reduced by equal to and between 0.25% and 1.75%, and more preferably may achieve a minimal reduction of about 1%. The union nut 18 is torqued onto the fitting 16 to a level where the inner diameter 110 of the sleeve 14 goes back to its original inner diameter before the union nut 18 was torqued onto the fitting 16. In other words, before the distal end portion 40 was connected to the sleeve 14, the sleeve had an inner diameter 110 of size of 0.87 inches for a 1.00 inch outer diameter tube. After the distal end portion of the tube 12 is connected to the sleeve 14, the inner diameter 110 of the sleeve 14 is slightly smaller because of the compressive force applied to the sleeve by the tube 12. When the tube 12 and the sleeve 14 is inserted into the fitting 16, the sleeve 14 may also apply a compressive force which is inwardly directed to further decrease the inner diameter 110 of the sleeve 14. When the union nut 18 is torqued down onto the fitting 16, the pressing surface 132 of the nut 18 applies an inward pressure on the tube 12 and the sleeve 14. Preferably, after the nut 18 is torqued down and removed, the inner diameter of the joint 12 is the same as inner diameter of the joint 20 before the nut 18 was torqued down on the fitting 16. The inner diameter of the joint 20 is determined by inserting a round gauge into the joint. The torque applied to the nut 18 does not cause the joint 20 to exceed its elastic limit. In other words, before the nut is torqued down on the fitting 16, the inner diameter of the joint 20 is determined. The nut is torqued down on to the fitting then removed. Optimally, the inner diameter of the joint 20 is tested to ensure that the inner diameter is the same before the nut 18 was torqued down on the fitting 16. The maximum torque is a level just before the inner diameter of the joint 20 is smaller after the nut 18 is torqued and removed from the fitting 16.

The high purity liquid distribution system in which the joint 20 is employed may operate having a liquid temperature equal to and between 21 degrees Celsius and 200 degrees Celsius and pressures between 37 pounds per square inch and 276 pounds per square inch. High purity liquid distribution systems are also known as chemical distribution systems and also known by the abbreviations CCSS, CDS or SDS and refer to the fluid or liquid being carried by the system. The high purity liquid distribution system discussed herein may carry liquids having a high acidity between 0-14 and may carry fluids such as sulfuric acid. The joint 20 described herein may meet the standards Semi F57-0301 standard.

The above description is given by way of example, and not limitation. Given the above disclosure, one skilled in the art could devise variations that are within the scope and spirit of the invention disclosed herein. Further, the various features of the embodiments disclosed herein can be used alone, or in varying combinations with each other and are not intended to be limited to the specific combination described herein. Thus, the scope of the claims is not to be limited by the illustrated embodiments.

What is claimed is:

1. A method of joining a tube fabricated from a perfluoroalkoxy (PFA) material to a sleeve which is fabricated from the PFA material, the method comprising the steps of: heating a heating body to at least 15 degrees Celsius below a softening temperature of the PFA material; disposing a distal end portion of the tube in a hole formed in the heating body until the distal end portion of the tube is in a pliable state; disposing a sleeve on a cylindrical post of a mandrel; removing the distal end portion of the tube out of the hole of the heating body; after the removing step, attaching the tube to the sleeve by disposing the distal end portion of the heated tube over the cylindrical post and the sleeve to facilitate faster cooling of an inner surface of the tube compared to an outer surface of the tube; after the disposing step, removing the attached tube and sleeve from the cylindrical post of the mandrel; allowing the distal end portion of the tube to remain in air which has a temperature between 15 degrees Celsius and 38 degrees Celsius until a temperature of the distal end portion of the tube is below 38 degrees Celsius.

2. The method of claim 1, further comprising a step of reducing an inner diameter of the tube at a faster rate compared to an outer diameter of the tube to shrink the distal end portion of the tube onto the sleeve.

3. The method of claim 1, wherein the disposing step includes the step of pushing the distal end portion of the heated tube until a distal end of the distal end portion of the tube contacts a stop flange of the sleeve.

4. The method of claim 2, wherein the reducing step includes reducing the inner diameter of the tube until a connection percentage between the inner surface of the tube and an outer surface of an enlarged diameter portion of the sleeve and a reduced diameter cylindrical section of the sleeve is equal to or greater than 75%.

5. The method of claim 4, wherein the connection percentage is between 90% and 96%.

6. The method of claim 1, wherein the step of removing the attached tube and sleeve from the cylindrical post of the mandrel is performed within 3 seconds after the disposing step.

7. The method of claim 1, wherein the heating step comprises heating the heating body to a temperature between 250 degrees Celsius and 290 degrees Celsius.

8. The method of claim 1, comprising a step of performing the disposing step within 10 seconds after the removing the distal end portion step.

9. The method of claim 1, further comprising a step of gripping the tube with a hand for performing the disposing step.

10. The method of claim 1, comprising a step of performing the removing the attached tube and sleeve step within 10 seconds after disposing step.

* * * * *